United States Patent
Yamaoka et al.

(10) Patent No.: US 8,090,239 B2
(45) Date of Patent: Jan. 3, 2012

(54) IDENTIFICATION-INFORMATION RECORDING SYSTEM, MANAGEMENT UNIT, RECORDING UNIT AND RECORDING CONTROL CIRCUIT

(75) Inventors: Masaru Yamaoka, Osaka (JP); Makoto Usui, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 1244 days.

(21) Appl. No.: 11/808,218

(22) Filed: Jun. 7, 2007

(65) Prior Publication Data

US 2007/0294714 A1    Dec. 20, 2007

(30) Foreign Application Priority Data

Jun. 9, 2006 (JP) ................. 2006-160543

(51) Int. Cl.
*H04N 9/80* (2006.01)
*H04N 7/167* (2006.01)

(52) U.S. Cl. ........ 386/255; 386/239; 386/248; 386/252; 386/259; 386/260; 380/200; 380/201; 380/202; 380/203; 380/223

(58) Field of Classification Search .......... 386/239, 386/248, 252, 255, 259, 260; 380/200, 201, 380/202, 203, 223
See application file for complete search history.

(56) References Cited

U.S. PATENT DOCUMENTS

| | | | | |
|---|---|---|---|---|
| 6,144,742 A * | 11/2000 | Gotoh et al. | ............... | 369/53.21 |
| 6,289,103 B1 * | 9/2001 | Sako et al. | ................... | 380/201 |
| 6,370,321 B1 * | 4/2002 | Asada et al. | .................. | 386/252 |
| 2005/0105884 A1 * | 5/2005 | Satoh et al. | ...................... | 386/69 |
| 2006/0062073 A1 * | 3/2006 | Kitani et al. | .................. | 365/232 |

FOREIGN PATENT DOCUMENTS

| | | |
|---|---|---|
| JP | 11-306675 | 11/1999 |
| JP | 2000-195049 | 7/2000 |
| JP | 2001-357533 | 12/2001 |
| JP | 2004-103163 | 4/2004 |
| JP | 2004-234744 | 8/2004 |
| JP | 2004-288280 | 10/2004 |
| JP | 2005-141389 | 6/2005 |
| JP | 2005-332556 | 12/2005 |
| WO | 2005/088891 | 9/2005 |

* cited by examiner

*Primary Examiner* — Thai Tran
*Assistant Examiner* — Daquan Zhao
(74) *Attorney, Agent, or Firm* — Wenderoth, Lind & Ponack, L.L.P.

(57) ABSTRACT

A management server has: an identification-information reproducing unit which reproduces identification information from an optical disk; an invalid-unit intrinsic-information registration section which registers the reproduced identification information; and a restriction-lifting decision section which decides, on the basis of the registered identification information and unit intrinsic information given intrinsically to every recording unit, whether the identification information can be recorded on a master optical disk. A recording unit has: a communication section which notifies the management server of the unit intrinsic information on this recording unit; an identification-information generation section which generates the identification information recorded on the master optical disk; an identification-information recording section which records the identification information on the master optical disk; and a restriction lifting section which controls the operation of the identification-information generation section and the identification-information recording section on the basis of the decision result of the restriction-lifting decision section.

15 Claims, 10 Drawing Sheets

IDENTIFICATION-INFORMATION RECORDING SYSTEM, MANAGEMENT UNIT, RECORDING UNIT AND RECORDING CONTROL CIRCUIT

BACKGROUND OF THE INVENTION

1. Field of the Invention

The present invention relates to an identification-information recording system which is capable of, when a master optical disk with identification information recorded by a recording unit is manufactured, preventing this recording unit from being wrongly used by monitoring the recording unit's recording of the identification information using a management unit via a network. It also relates to a management unit, a recording unit and a recording control circuit for the same purpose.

2. Description of the Background Art

In recent years, the capacity of an optical disk has been increasingly larger. Hence, for example, in a Blu-ray disk, high-vision contents having a high-quality image can be recorded for four hours or more, and thus, it is expected as a new distribution medium of high-quality contents. On the other hand, as the optical-disk technology makes advances, a grave disadvantage arises in that copyright is violated. Particularly, it is impossible to capture the actual situation of a manufacturer who copies an optical disk distributed on the market to manufacture its pirated edition. This hinders its copyright holder from taking effective countermeasures. Thereby, copyrighted articles cannot be soundly distributed using optical disks.

Therefore, a technique is disclosed in which identification information is recorded onto an optical disk so that a piratical manufacturer cannot make a copy (e.g., refer to Japanese Patent Laid-Open No. 2001-357533 specification). In this method, contents to be recorded onto an optical disk are encrypted beforehand, and the edge position of a record mark formed on the optical disk is displaced in its tangential direction by design. Or, by a special recording method such as displacing the record mark in the radial direction, key information on the encrypted contents is recorded. Accordingly, a piratical manufacturer who is not given how to read such key information is not authorized to read this key information. This helps prevent a false disk from being manufactured.

According to the above described prior art, a copy of a legitimate disk can be prevented from being made to manufacture an illegal pirated edition. However, in the recent optical-disk manufacturing situation, a copyright owner is not necessarily a person who produces a master optical disk. Hence, in the above described special recording method, if a manufacturer of a master optical disk who can record key information does misconduct, that cannot be restrained. Besides, a theatrical movie itself may be filmed using a digital video camera or the like, and then, an optical disk can be manufactured and distributed based on the filmed contents. Such a wrongdoing cannot be prevented, either.

In either case, a mastering service manufacturer who secures contents falsely and produces a master optical disk using the contents needs to be identified. If such a manufacturer cannot be restrained from manufacturing the master optical disk, no such misconduct as described above cannot be restricted.

SUMMARY OF THE INVENTION

In order to resolve the above described disadvantages, it is an object of the present invention to provide an identification-information recording system, a management unit, a recording unit and a recording control circuit which are capable of, based on identification information recorded on an optical disk, specifying a recording unit which has recorded this identification information, and if a decision is made that a false optical disk has been manufactured by the specified recording unit, thereafter restricting the recording of the identification information by the specified recording unit.

An identification-information recording system according to an aspect of the present invention, comprising: a recording unit which records, onto a master optical disk, identification information including unit intrinsic information given intrinsically to every recording unit; and a management unit which manages the recording of the identification information onto the master optical disk, wherein: the management unit includes a reproducing section which reproduces first identification information from an optical disk manufactured using a first master optical disk, and a registration section which extracts and registers at least a part of the first identification information reproduced by the reproducing section; the recording unit includes a hold section which holds the unit intrinsic information about this recording unit, and a notification section which notifies the management unit of the unit intrinsic information held in the hold section before second identification information is recorded onto a second master optical disk; the management unit further includes a decision section which decides whether the second identification information can be recorded onto the second master optical disk in the recording unit, based on the registration information of the registration section and the unit intrinsic information on the recording unit sent from the notification section of the recording unit; and the recording unit further includes an identification-information generation section which generates the second identification information including the unit intrinsic information held in the hold section, an identification-information recording section which records the second identification information onto the second master optical disk, and a recording control section which, based on the result of a decision made by the decision section of the management unit, controls the recording of the second identification information onto the second master optical disk.

A management unit according to another aspect of the present invention which manages the recording of identification information including unit intrinsic information given intrinsically to every recording unit onto a master optical disk, comprising: a reproducing section which reproduces first identification information from an optical disk manufactured using a first master optical disk; a registration section which extracts and registers at least a part of the first identification information reproduced by the reproducing section; and a decision section which decides whether a second identification information can be recorded onto a second master optical disk in the recording unit, based on the registration information of the registration section and the unit intrinsic information on the recording unit sent from the recording unit, wherein if the decision section of the management unit decides that the recording unit can record the second identification information onto the second master optical disk, the decision section notifies the recording unit of recording control information for authorizing the recording unit to record the second identification information onto the second master optical disk.

A recording unit according to still another aspect of the present invention which records, onto a master optical disk, identification information including unit intrinsic information given intrinsically to every recording unit, comprising: a hold section which holds the unit intrinsic information about the recording unit; a notification section which notifies a management unit of the unit intrinsic information held in the hold section before the identification information is recorded onto the master optical disk; an identification-information generation section which generates the identification information including the unit intrinsic information held in the hold section; an identification-information recording section which records the identification information onto the master optical disk; and a recording control section which controls the recording of the identification information onto the master optical disk, based on recording control information sent from the management unit.

A recording control circuit according to still another aspect of the present invention which is mounted on a recording unit that records identification information onto a master optical disk, comprising: a hold circuit which holds unit intrinsic information given intrinsically to the recording control circuit; a recording-signal generation circuit which generates a recording signal for recording the identification information including the unit intrinsic information held in the hold circuit onto the master optical disk; a recording restriction circuit which restricts at least either of the period of time when and the number of times where the identification information can be recorded onto the master optical disk; and a restriction lifting circuit which lifts the recording restriction on the identification information by the recording restriction circuit based on recording control information sent from a management unit by giving notice of the unit intrinsic information held in the hold circuit.

According to the above described configurations, an identification-information recording system, a management unit, a recording unit and a recording control circuit can be provided which are capable of recording identification information on an optical disk so that a copy is difficult to make, as well as even if a master optical disk is falsely manufactured using a recording unit which records the identification information, afterward annulling the recording of the identification information by the misused recording unit, and thereby, restraining the spread of such a false disk to the minimum.

These and other objects, features and advantages of the present invention will become more apparent upon reading of the following detailed description along with the accompanied drawings.

DESCRIPTION OF THE PREFERRED EMBODIMENTS

First Embodiment

Figure 1:
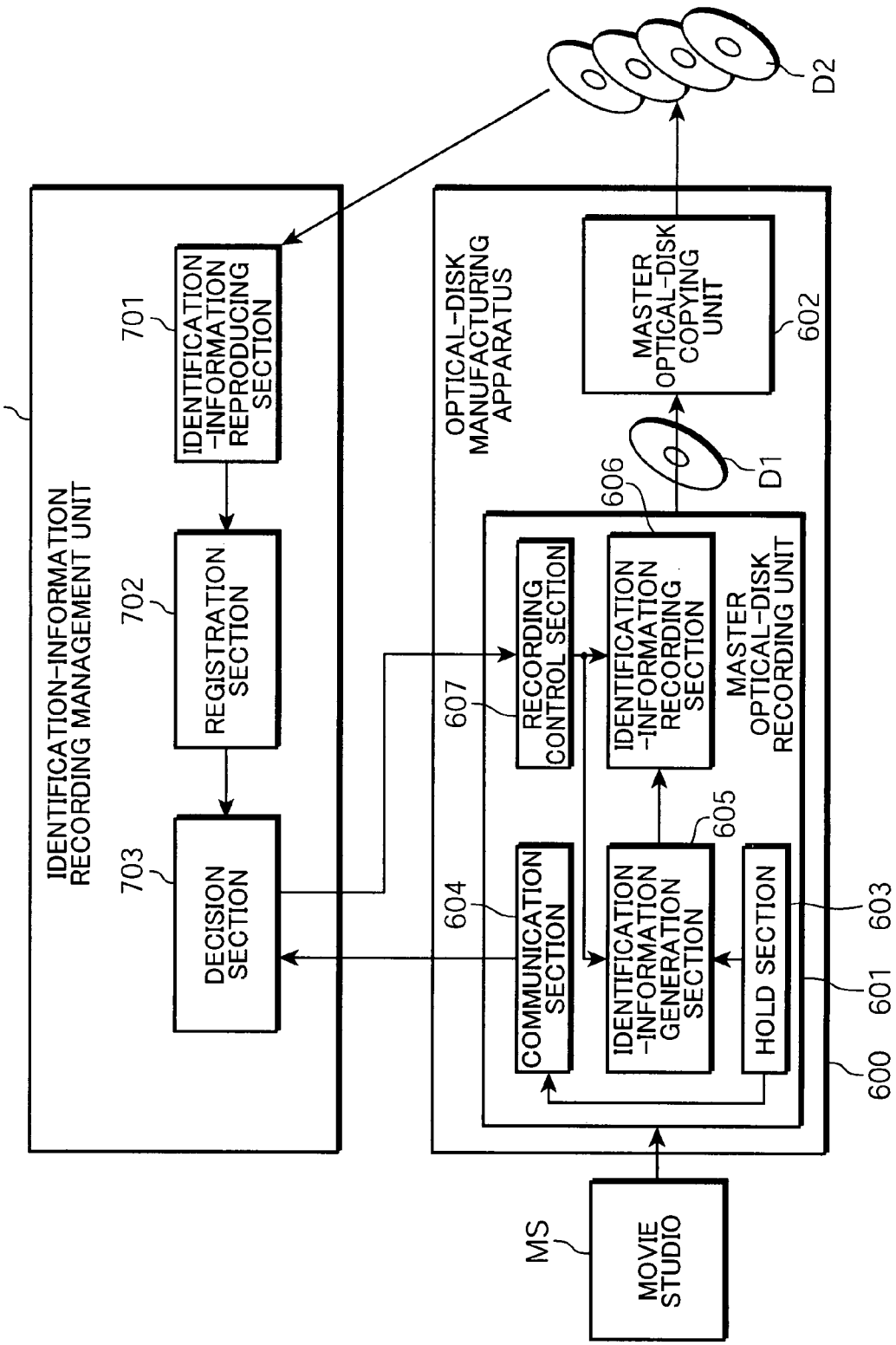
FIG. 1 is a block diagram, showing a form of an identification-information recording system according to a first embodiment of the present invention.

Hereinafter, an identification-information recording system according to a first embodiment of the present invention will be described in detail suitably with reference to the attached drawings. FIG. 1 is a block diagram, showing a form of the identification-information recording system according to this embodiment.

As shown in FIG. 1, the identification-information recording system according to this embodiment is configured by an optical-disk manufacturing apparatus 600 which produces a master optical disk D1 and manufactures a plurality of optical disks D2 from this master optical disk D1, and an identification-information recording management unit 700 which manages the recording of identification information onto the master optical disk D1.

A movie studio MS encrypts contents to be recorded onto an optical disk, and thereafter, authors them. Then, it sends the contents subjected to such authoring to the optical-disk manufacturing apparatus 600. In this way, the movie studio MS offers the contents to be recorded onto an optical disk to the optical-disk manufacturing apparatus 600.

The optical-disk manufacturing apparatus 600 is formed by a master optical-disk recording unit 601 which records contents and identification information onto the master optical disk D1, and a master optical-disk copying unit 602 which manufactures the plurality of optical disks D2 by transferring, onto a plurality of optical-disk bases, the pattern of the master optical disk D1 where the identification information has already been recorded by the master optical-disk recording unit 601. Herein, the identification information includes unit intrinsic information given intrinsically to every master optical-disk recording unit 601, and is recorded so as not to be easily copied onto the optical disk D2.

The master optical-disk recording unit 601 is provided with: a hold section 603; a communication section 604; an identification-information generation section 605; an identification-information recording section 606; and a recording control section 607. From the movie studio MS, the contents are sent, and before the identification information is recorded onto the master optical disk D1 including these contents, the communication section 604 outputs, to the identification-information recording management unit 700, the unit intrinsic information held intrinsically to every unit in the hold section 603 of the master optical-disk recording unit 601.

The identification-information recording management unit 700 is provided with: an identification-information reproducing section 701; a registration section 702; and a decision section 703. On the basis of the unit intrinsic information from the master optical-disk recording unit 601, the decision section 703 of the identification-information recording management unit 700 decides whether the master optical-disk recording unit 601 holding the unit intrinsic information can record the identification information. If deciding that it can make this record, it outputs a utilization approval to the master optical-disk recording unit 601.

If the recording control section 607 of the master optical-disk recording unit 601 is notified of this utilization approval by the identification-information recording management unit 700, it controls the recording of the identification information onto the master optical disk D1 by the identification-information generation section 605 and the identification-information recording section 606. On the basis of the unit intrinsic information intrinsic to the master optical-disk recording unit 601, the identification-information generation section 605 generates the identification information to be recorded onto the master optical disk D1. Then, the identification-information recording section 606 records the contents from the movie studio MS as well as the identification information onto the master optical disk D1.

The master optical-disk copying unit 602 transfers, onto the plurality of optical-disk bases, the pattern of the identification-information recorded master optical disk D1 manufactured by the master optical-disk recording unit 601. Thereby, it manufactures the plurality of optical disks D2.

The identification-information reproducing section 701 of the identification-information recording management unit 700 reproduces the optical disks D2 or the like and extracts the identification information recorded on the optical disk. Specifically, among the optical disks distributed on the market, the identification-information reproducing section 701 reproduces an optical disk decided to be false by a copyright holder such as the movie studio MS. Then, it extracts the identification information recorded on this false disk.

The registration section 702 of the identification-information recording management unit 700 extracts the unit intrinsic information given to the identification information extracted from the false disk. Then, it specifies the master optical-disk recording unit 601 which has recorded the identification information, and registers this unit intrinsic information on a black list.

Before recording the contents information and the identification information onto the master optical disk D1, the communication section 604 of the master optical-disk recording unit 601 in which the unit intrinsic information is registered on the black list notifies the identification-information recording management unit 700 of the unit intrinsic information intrinsically to every master optical-disk recording unit 601 which is held in the hold section 603.

If it is notified of the unit intrinsic information by the master optical-disk recording unit 601, the decision section 703 of the identification-information recording management unit 700 decides whether this unit intrinsic information is registered on the black list held in the registration section 702.

If the unit intrinsic information sent from the master optical-disk recording unit 601 is not registered on the black list, the decision section 703 transmits, to the master optical-disk recording unit 601, a utilization approval (i.e., the recording control information) for authorizing recording the identification information onto the master optical disk D1. On the other hand, if the identification information sent from the master optical-disk recording unit 601 is registered on the black list, the decision section 703 does not transmit the utilization approval to the master optical-disk recording unit 601. Thereby, from this time on, the master optical-disk recording unit 601 holding the unit intrinsic information registered on the black list of the identification-information recording management unit 700 will not be able to record at least the identification information onto the master optical disk D1.

As described so far, according to this embodiment, the identification information can be recorded on an optical disk so that a copy is difficult to make, as well as even if a master optical disk is falsely manufactured using the master optical-disk recording unit 601 which records the identification information, then after this, the recording of the identification information by the misused master optical-disk recording unit 601 becomes invalid, and thereby, the spread of such a false disk can be reduced to the minimum.

Second Embodiment

Figure 2:
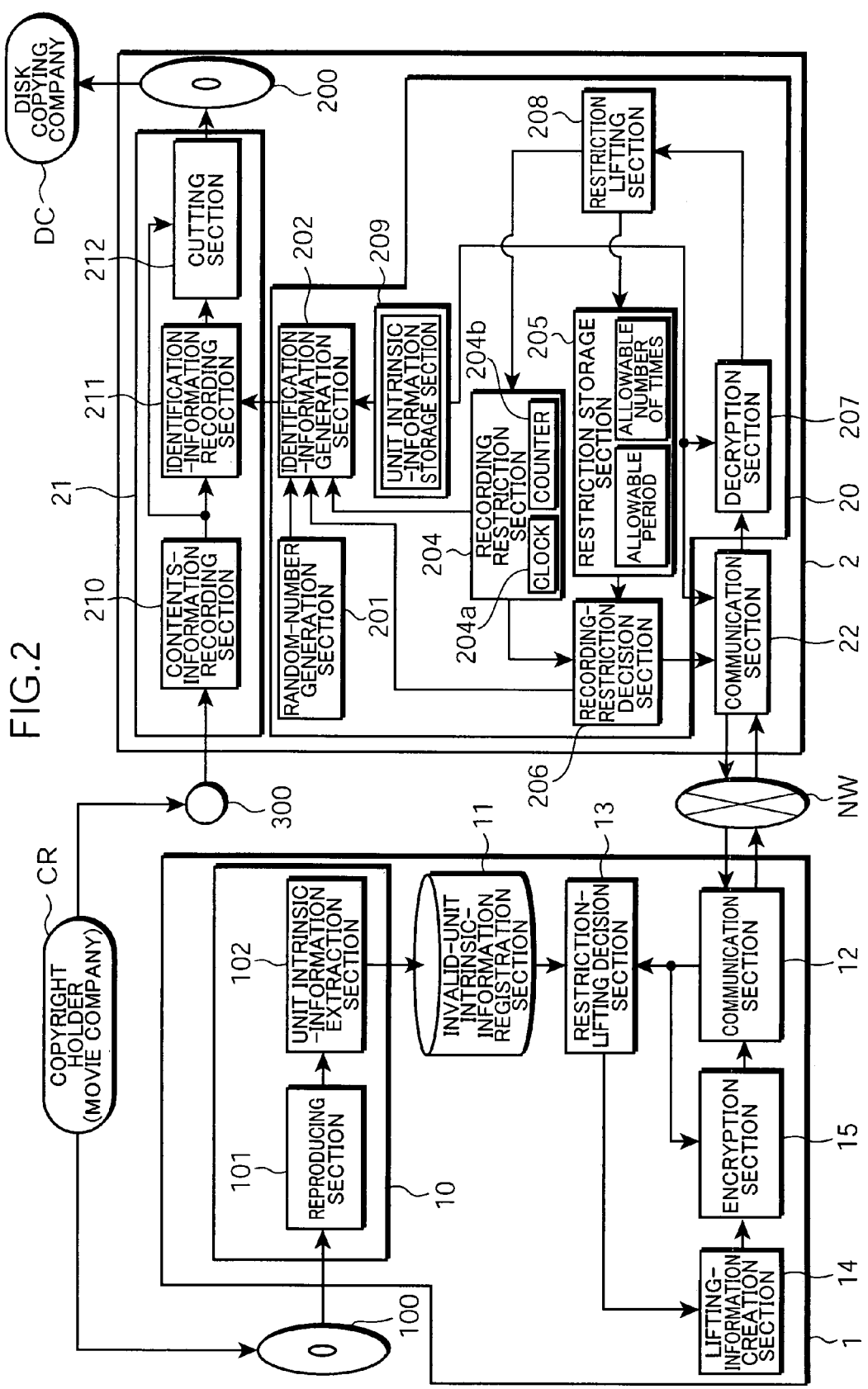
FIG. 2 is a block diagram, showing the configuration of an identification-information recording system according to a second embodiment of the present invention.

Next, a description will be given about an identification-information recording system according to a second embodiment of the present invention. FIG. 2 is a block diagram, schematically showing an example of the identification-information recording system which records identification information onto a master optical disk according to this embodiment. A management server 1 and a recording unit 2 connect via a general-purpose network NW or the like, so that they can communicate together.

The management server 1 includes: an identification-information reproducing unit 10; an invalid-unit intrinsic-information registration section 11; a communication section 12; a restriction-lifting decision section 13; a lifting-information creation section 14; and an encryption section 15. The identification-information reproducing unit 10 is provided with a reproducing section 101 and a unit intrinsic-information extraction section 102.

The management server 1 reads identification information from an optical disk 100 with unjust contents recorded thereon which is brought in by a copyright holder CR such as a movie company or the like, and then, it manages it. In accordance with a recording-restriction lifting request from the recording unit 2, the management server 1 decides whether the restriction can be removed on the recording of the identification information by the recording unit 2 which has made this recording-restriction lifting request. Only if it can be removed, it transmits restriction-lifting information (i.e., the recording control information) to the recording unit 2.

The recording unit 2 includes an identification-information recording unit 20, a mastering unit 21, and a communication section 22. The recording unit 2 records, onto a master optical disk 200, contents information such as a movie title which is brought in by the copyright holder CR such as a movie company and identification information.

The identification-information recording unit 20 is provided with: a unit intrinsic-information storage section 209; a random-number generation section 201; an identification-information generation section 202; a recording restriction section 204; a restriction storage section 205; a recording-restriction decision section 206; a decryption section 207; and a restriction lifting section 208. The identification-information recording unit 20 decides whether the identification information can be recorded onto the master optical disk 200. If the recording of the identification information is restricted, it requests the management server 1 to remove this restriction.

At first, a description will be given about a procedure for, if the copyright holder CR decides that an optical disk distributed on the market is an illegal disk, then registering the identification information of the identification-information recording unit 20 which has manufactured this illegal disk.

First, among the optical disks distributed on the market, the falsely-produced optical disk 100 is brought into the management server 1 by the copyright holder CR such as a movie company. In this case, the reproducing section 101 of the identification-information reproducing unit 10 reads the identification information from the optical disk 100 and outputs it to the unit intrinsic-information extraction section 102.

Figure 3:
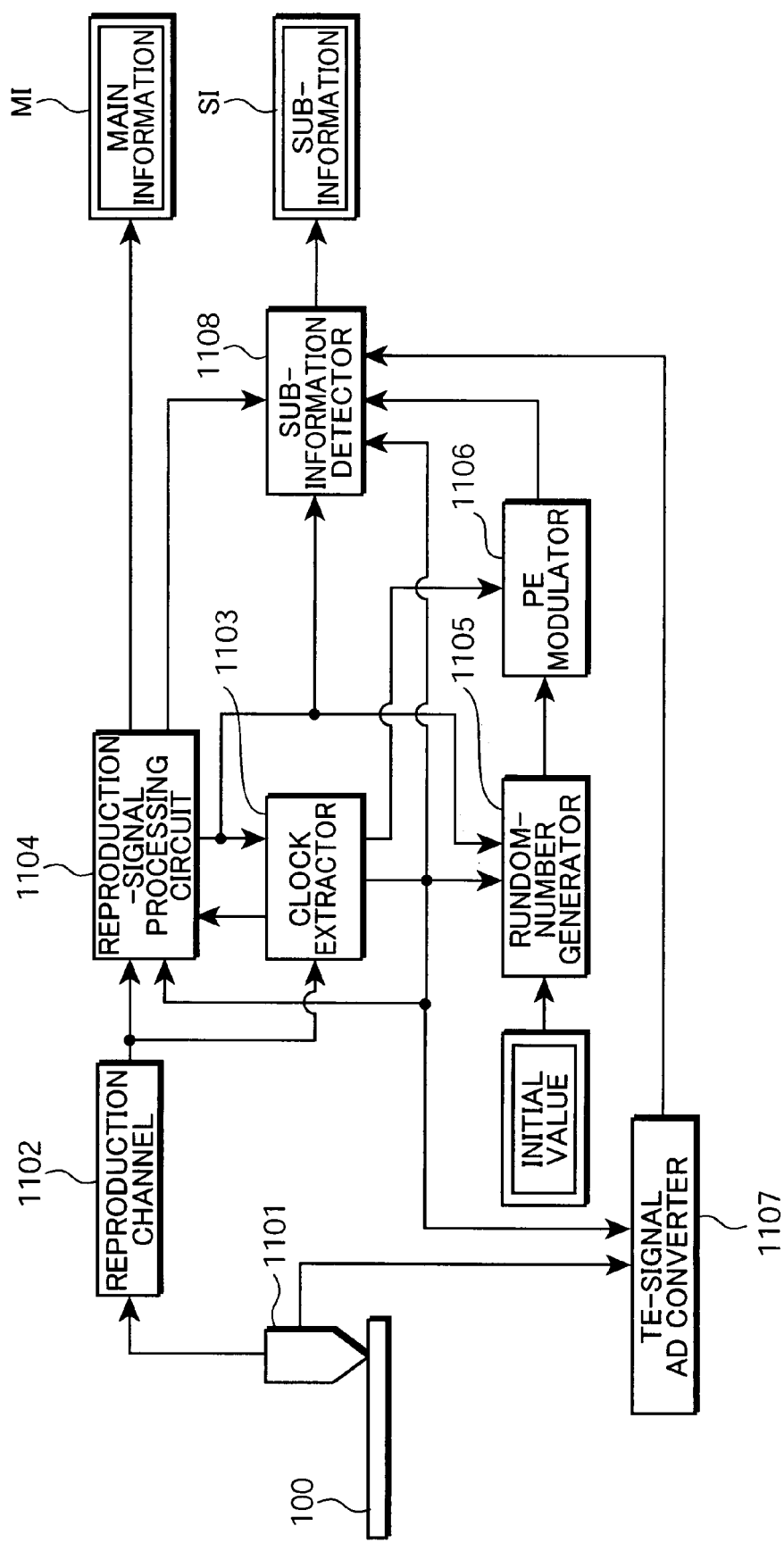
FIG. 3 is a block diagram, showing the configuration of a reproducing section shown in FIG. 2.
Figure 4:
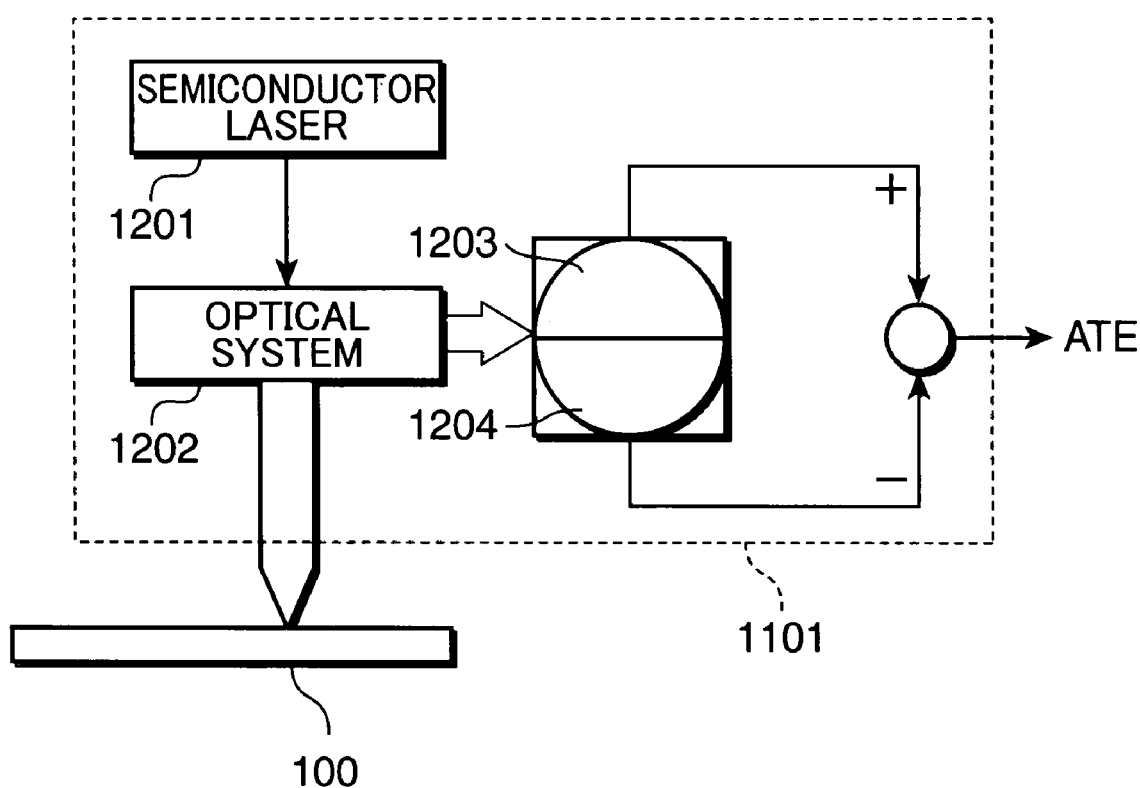
FIG. 4 is a block diagram, showing a main configuration for generating a TE signal which indicates the displacement of a record mark in the radial direction in a reproducing head shown in FIG. 3.
Figure 5:
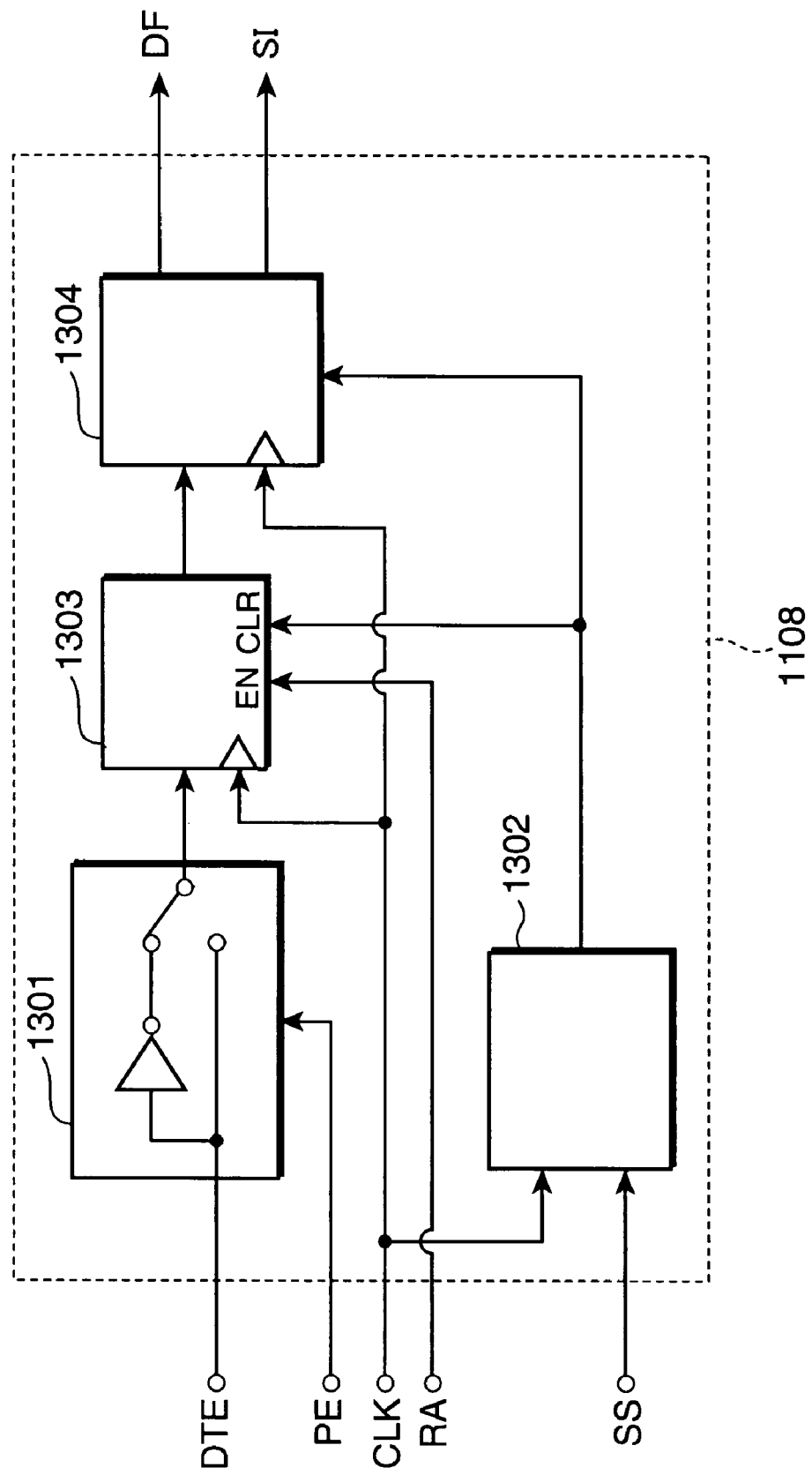
FIG. 5 is a block diagram, showing the configuration of a sub-information detector shown in FIG. 3.

Next, the reproducing section 101 in the identification-information reproducing unit 10 of the management server 1 will be described in detail with reference to FIGS. 3 to 5. In FIGS. 3 to 5, contents information or management information about the optical disk which is recorded with a concave-and-convex mark on an optical disk is main information while identification information recorded by displacing the concave-and-convex mark in the radial direction is sub-information.

FIG. 3 is a block diagram, showing the main part of the reproducing section 101 shown in FIG. 2. As shown in FIG. 3, the reproducing section 101 is provided with: a reproducing head 1101; a reproduction channel 1102; a clock extractor 1103; a reproduction-signal processing circuit 1104; a random-number generator 1105; a PE (or phase encoding) modulator 1106; a TE-signal AD converter 1107; and a sub-information detector 1108.

The reproducing head 1101 focuses a light beam upon a record mark on the optical disk 100 and irradiates it. Using a photo-detector, it converts the reflected beam into an electric signal. Thereby, it generates an RF signal which is a reproduced signal for the information recorded with the record mark, and outputs it to the reproduction channel 1102. Along with this, the reproducing head 1101 generates an analog TE (or tracking error) signal which indicates the radial displacement of the record mark. Then, it outputs it to the TE-signal AD converter 1107. The analog TE signal is a signal which is obtained by allowing the central position of the light beam to track the central position of the record mark recorded helically on the optical disk 100.

FIG. 4 is a block diagram, showing a main configuration for generating the analog TE signal which indicates the displacement of the record mark in the radial direction in the reproducing head 1101 shown in FIG. 3.

In the reproducing head 1101, an optical system 1202 concentrates a laser beam emitted from a semiconductor laser 1201 so that it focuses on the record mark on the optical disk 100. Besides, the optical system 1202 separates the laser beam which irradiates the optical disk 100 and the reflected beam from the optical disk 100. Photo-detectors 1203, 1204 convert this reflected beam into an electric signal. The photo-detectors 1203, 1204 are symmetrical, on the outer-circumference side and the inner-circumference side, respectively, with respect to the center line of the record mark. The photo-detectors 1203, 1204 electrically discriminate the lightness of the reflected beam on the outer-circumference side or the inner-circumference side, respectively. Hence, if the difference is taken between the signal level of the photo-detector 1203 and the signal level of the photo-detector 1204, the displacement of the record mark in the radial direction can be extracted. An analog TE signal ATE which indicates the radial displacement of the record mark can be obtained.

Ordinarily, a tracking servo allows the central position of the laser beam to track the central position of the record mark. However, for example, if the record mark is displaced in the outer-circumference direction, the reflected beam sensed by the photo-detector 1203 is higher than that sensed by the photo-detector 1204. Thereby, a "+" electric potential is outputted as the analog TE signal ATE. In contrast, if the central position of the record mark is displaced on the inner-circumference side, the reflected beam sensed by the photo-detector 1203 is lower than the photo-detector 1204. Thereby, a "−" electric potential is outputted as the analog TE signal ATE. Such a TE signal is outputted within the same band as an RF signal which is an analog reading signal for the record mark.

Again, with reference to FIG. 3, the reproduction channel 1102 executes the equalization or shaping of a waveform for the RF signal from the reproducing head 1101. Thereby, it transforms the RF signal into a digital reading signal and outputs it to the clock extractor 1103 and the reproduction-signal processing circuit 1104.

The clock extractor 1103 has a PLL (or phase locked loop) circuit for extracting, from the digital reading signal digitized by the reproduction channel 1102, a clock signal which synchronizes with this digital reading signal. In addition, in the timing of a synchronizing signal from the reproduction-signal processing circuit 1104 (described later), the clock extractor 1103 allows the clock signal extracted from the PLL circuit to undergo a 16 frequency division. Thereby, it generates a byte clock which synchronizes with the 16-bit unit of the digital reading signal and a PE signal which is front 8-bit "High", back 8-bit "Low" in the 16-bit unit of the digital reading signal. The clock extractor 1103 outputs the byte clock to the reproduction-signal processing circuit 1104, the random-number generator 1105, the TE-signal AD converter 1107 and the sub-information detector 1108. Then, it outputs the PE signal to the PE modulator 1106.

On the basis of the digital reading signal from the reproduction channel 1102 and the byte clock from the clock extractor 1103, the reproduction-signal processing circuit 1104 generates a synchronizing signal which indicates that a synchronizing code has been detected. Then, it regards this synchronizing code's detection position as a reference, and demodulates the digital reading signal in the 16-bit unit into 1-byte (i.e., 8-bit) main information. Thereby, it reproduces main information MI. Besides, the reproduction-signal processing circuit 1104 outputs the synchronizing signal generated as a result of detecting the synchronizing code from the digital reading signal to the clock extractor 1103, the random-number generator 1105 and the sub-information detector 1108.

The random-number generator 1105 has the same function as a random-number generator 403 (described later) of the mastering unit 21. In the timing of "High" of the synchronizing signal from the reproduction-signal processing circuit 1104, it presets an initial value stored in secret on its inside. In the timing of the byte clock from the clock extractor 1103, it generates a random-number sequence (i.e., a correlation sequence) by 1 bit at a time. Then, it outputs them to the PE modulator 1106.

Furthermore, from the above described synchronizing code, the reproduction-signal processing circuit 1104 judges a frame number inside of the sector which is currently reproduced. Then, it generates a correlation detection authorization signal which is "Low" at the first frame, the 26th frame inside of the sector and in the interval where the synchronizing code is detected and is "High" in the data part other than the above described parts. Then, it outputs it to the sub-information detector 1108.

The PE modulator 1106 has the same function as a PE modulator 405 (described later) of the mastering unit 21 and is formed by an exclusive OR gate. It calculates the exclusive OR of the random-number sequence (i.e., correlation sequence) from the random-number generator 1105 and the PE signal from the clock extractor 1103. Thereby, it generates a PE-modulation correlation sequence and outputs it to the sub-information detector 1108.

The TE-signal AD converter 1107 samples the analog TE signal from the reproducing head 1101 in the timing of the byte clock from the clock extractor 1103. Then, it converts it into a digital signal. The digital TE signal obtained in this AD conversion is outputted to the sub-information detector 1108.

The sub-information detector 1108 detects sub-information SI on the basis of: the byte clock from the clock extractor 1103; the synchronizing signal and the correlation detection authorization signal from the reproduction-signal processing circuit 1104; the PE-modulation correlation sequence from the PE modulator 1106; and the digital TE signal from the TE-signal AD converter 1107.

FIG. 5 is a block diagram, showing the configuration of the sub-information detector 1108 shown in FIG. 3. As shown in FIG. 5, the sub-information detector 1108 includes: a selector 1301; a sub-information update-timing generator 1302; a level integrator 1303; and a threshold decision unit 1304.

The selector 1301 allows a digital TE signal DTE outputted by the TE-signal AD converter 1107 to undergo a level conversion in accordance with a PE-modulation correlation sequence PE from the PE modulator 1106. Then, it outputs it to the level integrator 1303. In this embodiment, the digital TE signal DTE is zero level when the record mark lies at the central position. In addition, it is a "+", level when the record mark is displaced on the outer-circumference side and it is a "−" level when the record mark is displaced on the inner-circumference side. Besides, it takes the complement representation of two.

For example, if the PE-modulation correlation sequence PE from the PE modulator 1106 is "1", then the selector 1301 keeps the "+" level, the "−" level of the digital TE signal DTE unchanged as the "+" level, the "−" level, respectively. Then it outputs it to the level integrator 1303. In contrast, if the PE-modulation correlation sequence PE is "0", then the selector 1301 inverts its "+" level, "−" level to be the "−" level, the "+" level, respectively. Then, it outputs it to the level integrator 1303.

The sub-information update-timing generator 1302 counts a byte clock CLK from the clock extractor 1103 and a synchronizing signal SS from the reproduction-signal processing circuit 1104. Thereby, it calculates a frame number inside of the sector which is now reproduced. Then, it generates a timing signal for updating sub-information in a 3-frame unit within the total 24 frames except the first and the 26th frames inside of the sector. Sequentially, it outputs it to the level integrator 1303 and the threshold decision unit 1304.

In the interval where a correlation detection authorization signal RA from the reproduction-signal processing circuit 1104 is "High", the level integrator 1303 calculates an integral value of the digital TE signal of the complement representation of two inverted partly which is outputted from the selector 1301. In the timing of the sub-information update-timing signal outputted once for every three frames from the sub-information update-timing generator 1302, the level integrator 1303 outputs the integral result to the threshold decision unit 1304. At the same time, it clears (or zeros) the integral value inside of the level integrator 1303.

Therefore, the output of the level integrator 1303 continues to increase toward a positive value as the integral value, if the PE-modulation correlation sequence PE is "1" and the digital TE signal DTE is a "+" level, or if the PE-modulation correlation sequence PE is "0" and the digital TE signal DTE is a "−" level. On the other hand, the output of the level integrator 1303 continues to decrease toward a negative value as the integral value, if the PE-modulation correlation sequence PE is "1" and the digital TE signal DTE is a "−" level, or if the PE-modulation correlation sequence PE is "0" and the digital TE signal DTE is a "+" level.

The threshold decision unit 1304 has a positive threshold value and a negative threshold value stored therein. Using these positive and negative threshold values, it makes a threshold decision for an integral value outputted once for every three frames from the level integrator 1303. Thereby, if there are a detection flag DF indicating whether or not there is the sub-information SI and the sub-information SI, it outputs this sub-information SI.

In the threshold decision processing by the threshold decision unit 1304, if the integral value outputted from the level integrator 1303 is equal to, or above, the positive threshold value, then a bit value "0" is outputted as the sub-information SI. Simultaneously, "High" is outputted as the detection flag DF. In contrast, if the integral value is equal to, or below, the negative threshold value, then a bit value "1" is outputted as the sub-information SI. Simultaneously, "High" is outputted as the detection flag DF. On the other hand, if the integral value does not reach the positive threshold value and is greater than the negative threshold value (i.e., if the integral value is near zero, compared with the positive and negative threshold values), then "Low" is outputted as the detection flag DF. This means that the sub-information SI has not been detected.

Figure 6:
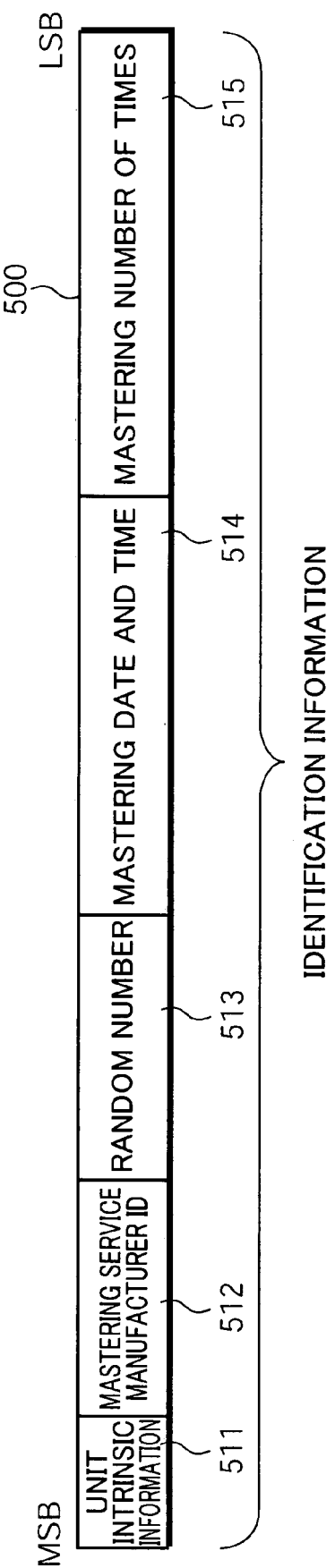
FIG. 6 is an illustration, showing an example of the configuration of identification information.

FIG. 6 is an illustration, showing an example of the configuration of an example of identification information reproduced by the reproducing section 101 shown in FIG. 2. Identification information 500 recorded on the optical disk 100 is formed by, from the uppermost bit: unit intrinsic information 511; a mastering service manufacturer ID 512; a random number 513; a mastering date and time 514; and a mastering number of times 515.

The unit intrinsic information 511 is information intrinsic to every unit for identifying the identification-information recording unit 20 which has recorded the identification information 500 or has generated a signal for this recording. The mastering service manufacturer ID 512 is ID information intrinsic to a manufacturer which produces a master optical disk for manufacturing the optical disk 100. The random number 513 is a random-number value intrinsic in each creation of the master optical disk as information intrinsic to the master optical disk for manufacturing the optical disk 100. The mastering date and time 514 is time-stamp information on the time when the master optical disk for manufacturing the optical disk 100 is manufactured. The mastering number of times 515 is the number of times by which the unique identification information for every master optical disk is generated. It is equivalent to information which expresses the number of times by which the master optical disk is manufactured by the identification-information recording unit 20.

Again, with reference to FIG. 2, the identification information 500 reproduced by the reproducing section 101 is outputted to the unit intrinsic-information extraction section 102. The unit intrinsic-information extraction section 102 extracts the unit intrinsic information 511 inside of the identification information 500. Then, it outputs it to the invalid-unit intrinsic-information registration section 11.

The invalid-unit intrinsic-information registration section 11 registers the unit intrinsic information 511 extracted by the unit intrinsic-information extraction section 102. Every time the unit intrinsic information 511 is outputted from the unit intrinsic-information extraction section 102, the invalid-unit intrinsic-information registration section 11 adds and registers them. In other words, the unit intrinsic information 511 on the identification-information recording unit 20 possessed by a manufacturer which produces the master optical disk of a false optical disk distributed on the market whose decision is made by the copyright holder CR such as a movie company is registered one after another in the invalid-unit intrinsic-information registration section 11. In such a procedure as described above, the unit intrinsic information 511 is registered about the identification-information recording unit 20 which has recorded the identification information 500 of a false optical disk.

As described above, in the invalid-unit intrinsic-information registration section 11 of the management server 1 is accumulated the identification-information recording unit 20 which has manufactured a false optical disk, in other words, the unit intrinsic information 511 for identifying the recording unit 2.

Next, a procedure will be described for recording identification information onto the master optical disk 200, mainly using the recording unit 2. First, the copyright holder CR such as a movie company sends contents information recorded on a tape-type recording unit 300 to a manufacturer (which means a mastering service manufacturer) of a master optical disk. Thereby, it asks this mastering service manufacturer to produce the master optical disk. The mastering service manufacturer which has received this manufacturing request inputs the tape-type recording unit 300 with the contents recorded therein in a contents-information recording section 210 of the recording unit 2.

On the basis of the contents information recorded on the tape-type recording unit 300, the contents-information recording section 210 generates a contents recording signal for this contents information. Then, it outputs it to a cutting section 212. Simultaneously, it outputs, to an identification-information recording section 211, a synchronizing signal which indicates the timing in giving a synchronizing code at predetermined intervals when the contents information is recorded.

On the basis of the synchronizing signal from the contents-information recording section 210 and the identification information from the identification-information generation section 202, the identification-information recording section 211 generates an identification-information recording signal. Then, it outputs it to the cutting section 212. The cutting section 212 manufactures the master optical disk 200 based upon the identification-information recording signal from the identification-information recording section 211 and the contents recording signal from the contents-information recording section 210.

Figure 7:
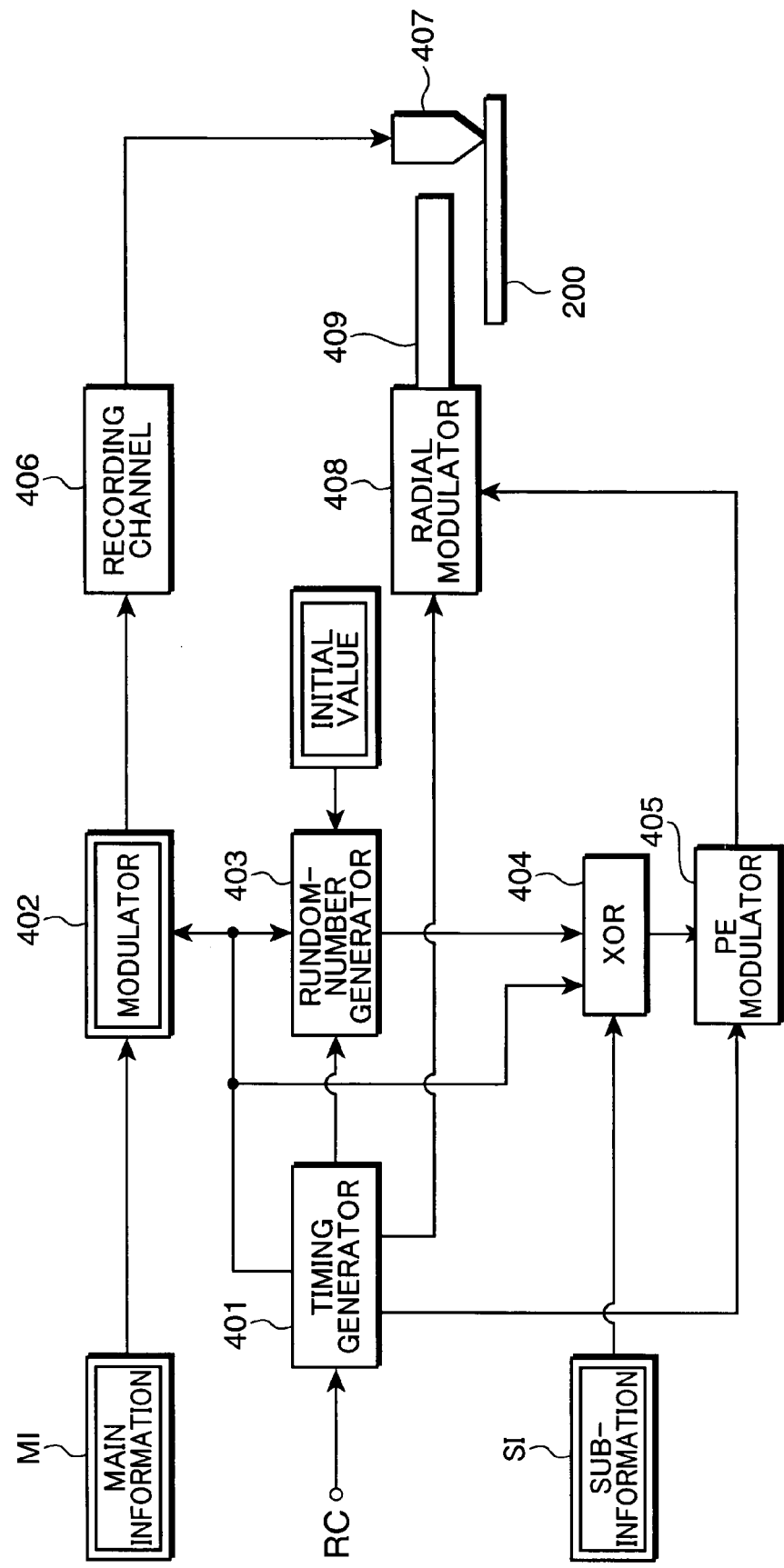
FIG. 7 is a block diagram, showing the configuration of a mastering unit shown in FIG. 2.

Herein, FIG. 7 show a main block configuration of the mastering unit 21 shown in FIG. 2. As described earlier, the mastering unit 21 is formed by the contents-information recording section 210, the identification-information recording section 211 and the cutting section 212. Herein, further detailed component elements are offered, and the contents information, the identification-information are given as the main information MI, the sub-information SI, respectively.

The mastering unit 21 shown in FIG. 7 includes: a timing generator 401; a modulator 402; a random-number generator 403; an XOR circuit 404; a PE modulator 405; a recording channel 406; a radial modulator 408; and a recording head 407. The mastering unit 21 forms an optically-readable record mark helically on the master optical disk 200 (e.g., a DVD). Thereby, it records the main information MI. At the same time, in accordance with a displacement control signal generated based on the timing in inserting a synchronizing code into a frame unit of the main information MI, it records the sub-information SI by slightly displacing the above described record mark in the radial direction.

The timing generator 401 receives a recording clock RC which is a reference clock signal for recording the main information MI. Then, it generates a synchronizing signal, a byte clock, a displacement authorization signal and a PE signal. The timing generator 401 outputs this synchronizing signal to the modulator 402, the random-number generator 403 and the XOR circuit 404, the byte clock to the random-number generator 403, the displacement authorization signal to the radial modulator 408, and the PE signal to the PE modulator 405, respectively.

Herein, the synchronizing signal is a signal which is produced from the recording clock and indicates the timing in inserting the synchronizing code at fixed intervals in accordance with a result obtained when the modulator 402 modulates the main information MI. In a DVD, it is a signal which indicates the 32-clock interval from the frame head to be recorded. The byte clock is a clock signal which synchronizes with the byte unit (equivalent to a 16 recording clock) of the main information MI to be recorded. In the DVD, it is generated by allowing the recording clock to undergo a 16 frequency division. The displacement authorization signal is a signal which becomes "Low" only at the first and the 26th frames and in the timing when the synchronizing code is given. In the DVD, it becomes "Low" in the timing when the modulator 402 inserts the synchronizing code and in the interval of the first and the 26th frames inside of the sector to be recorded, and becomes "High" in the interval other than the above timings. The PE signal is a signal which becomes front 8-bit "High" and back 8-bit "Low" of the byte unit (equivalent to a 16 recording clock) of the main information MI to be recorded. It is a signal for repeating 8-clock "Low" after 8-clock "High".

The modulator 402 converts (8-16 modulates) the main information MI to be recorded in the byte (or 8-bit) unit into 16-bit information. Simultaneously, it inserts the synchronizing code in the interval where the synchronizing signal from the timing generator 401 is "High". Thereby, it generates a channel code. Then, the modulator 402 allows this channel code to undergo an NRZI conversion. Thereby, it generates a channel signal and outputs it to the recording channel 406.

The random-number generator 403 generates a pseudo-random number sequence from the synchronizing signal and the byte clock from the timing generator 401. Thereby, it outputs it to the XOR circuit 404. The XOR circuit 404 is a section which calculates the exclusive OR of the pseudo-random number sequence and the sub-information SI to be recorded. Then, it generates the displacement control signal and outputs it to the PE modulator 405.

The PE modulator 405 generates a PE-modulation displacement control signal, based upon the displacement control signal outputted from the XOR circuit 404 and the PE signal outputted from the timing generator 401. Then, it outputs it to the radial modulator 408. The PE modulator 405 is formed by an exclusive OR gate.

In accordance with "1", "0" of a channel signal from the modulator 402, the recording channel 406 generates a control signal for turning "ON" or "OFF" a recording beam to which the master optical disk 200 (e.g., a DVD) is exposed. Then, it outputs it to the recording head 407. On the basis of the "ON" or "OFF" signal from the recording channel 406, the recording head 407 applies the recording beam onto the master optical disk 200. Thereby, it forms a record mark to record the main information MI.

The radial modulator 408 controls the voltage applied to an electrode 409 provided near the recording head 407. Thereby, it refracts the recording beam applied from the recording head 407 onto the master optical disk 200. This makes it possible to record the record mark by shifting it slightly in the radial direction. Consequently, based on the PE-modulation displacement control signal inputted from the PE modulator 405, the applied recording beam is refracted in the radial direction. Thereby, the position in which the record mark is formed is displaced in the radial direction, so that the sub-information SI can be recorded.

Next, with reference to FIG. 2, a procedure will be described for generating identification information to be recorded by the mastering unit 21. The identification information is generated using the configuration of the identification information 500 shown in FIG. 6, on the basis of the unit intrinsic information intrinsic to every identification-information recording unit 20 which is stored in the unit intrinsic-information storage section 209, the random-number sequence generated by the random-number generation section 201, time-stamp information from a clock 204a inside of the recording restriction section 204 and a mastering number of times for a master optical disk from a counter 204b.

Next, in the unit intrinsic-information storage section 209 of the identification-information recording unit 20, the unit intrinsic information is stored so as not to be updated through any access from the outside. For example, the unit intrinsic information is stored in a ROM-type memory, or it is stored so as to be embedded in any of the LSI circuits which make up the identification-information recording unit 20. Therefore, a third party can be prevented from rewriting the unit intrinsic information maliciously so that the identification-information recording unit 20 can impersonate another identification-information recording unit. Another wrongdoing can also be prevented, such as disabling the unit intrinsic information from identifying the identification-information recording unit 20.

Only if the recording-restriction decision section 206 decides that the identification information can be recorded, the identification-information generation section 202 generates the identification information. Then, it outputs it to the identification-information recording section 211 of the mastering unit 21. If the recording-restriction decision section 206 decides that the identification information cannot be recorded onto the master optical disk 200, it stops the identification-information generation section 202 from generating the identification information. Or, it stops the generated identification information from being outputted to the identification-information recording section 211 of the mastering unit 21.

The recording restriction section 204 has the clock 204a and the counter 204b therein. The clock 204a executes a clocking operation to manage the time at present, or manages the total recording time or the operation time of the identification information. The counter 204b manages the number of times by which the identification information is recorded onto the master optical disk 200. If deciding that the identification information can be recorded onto the master optical disk 200, the recording-restriction decision section 206 outputs, to the identification-information generation section 202, the current time managed by the clock 204a, the total recording time or the operation time of the identification information and the number of times of the recording of the identification information managed by the counter 204b. After outputting such time information or counter information to the identification-information generation section 202, the recording restriction section 204 updates the value of the internal counter 204b by giving "+1". Or, it may also execute an increment in the value of the internal counter 204b when the identification information has been exactly recorded onto the master optical disk 200.

In the restriction storage section 205, authorization information is stored for recording the identification information onto the master optical disk 200. Specifically, in its inside is stored an allowable period of time which indicates how long the identification information can be recorded, or an allowable number of times which indicates how many times the identification information can be recorded.

Before the identification-information generation section 202 generates the identification information or while it is generating it, the recording-restriction decision section 206 decides whether the identification information can be recorded onto the master optical disk 200, with reference to the clock information of the clock 204a and the number-of-times information of the counter 204b (i.e., restriction information) which come from the recording restriction section 204, as well as an allowable period of time when and an allowable number of times by which the identification information can be generated (i.e., allowance information) which come from the restriction storage section 205.

In detail, if the time indicated by the clock 204a of the recording restriction section 204 is within the allowable period of the restriction storage section 205, the recording-restriction decision section 206 decides that the identification information can be recorded onto the master optical disk 200. Then, it authorizes the identification-information generation section 202 to generate the identification information. In addition, if the number of times by which the identification information is generated which is indicated by the counter 204b of the recording restriction section 204 is within the allowable number of times of the restriction storage section 205, the recording-restriction decision section 206 decides that the identification information can be recorded onto the master optical disk 200. Then, it authorizes the identification-information generation section 202 to generate the identification information.

On the other hand, if the present time indicated by the clock 204a of the recording restriction section 204 or the number of times of the generation of the identification information indicated by the counter 204b is beyond the allowable period or the allowable number of times stored in the restriction storage section 205, it will not authorize the identification-information generation section 202 to generate the identification information, or will not permit the output of the identification information to the identification-information recording section 211. Hence, in such a case, the identification information cannot be recorded onto the master optical disk 200, thus making the normal production of an optical disk impossible.

Moreover, if deciding that the identification-information generation section 202 cannot generate the identification information, the recording-restriction decision section 206 generates a restriction lifting request which is a request to lift the restriction on the recording of the identification information. Then, it outputs it to the communication section 22.

Upon receiving this restriction lifting request from the recording-restriction decision section 206, the communication section 22 generates a recording-restriction lifting request including the unit intrinsic information of the identification-information recording unit 20 stored in the unit intrinsic-information storage section 209. Then, it establishes a privacy communication network NW with the management server 1 and transmits the recording-restriction lifting request to the management server 1. As the privacy communication network NW, cryptographic communication by an SSL (or secure socket layer) or a virtual private network by a VPN is available. This helps build up a secure network connection between the management server 1 and the recording unit 2. Using such a network connection, falsification, wiretapping or the like can be prevented midway between them.

Upon receiving the recording-restriction lifting request from the communication section 22 of the recording unit 2, the communication section 12 of the management server 1 extracts the unit intrinsic information corresponding to the identification-information recording unit 20 of the recording unit 2 of the request origin which is included in this recording-restriction lifting request. Then, it outputs it to the restriction-lifting decision section 13 and the encryption section 15.

Upon receiving the recording-restriction lifting request from the communication section 12, the restriction-lifting decision section 13 is given the request-origin unit intrinsic information inside of the recording-restriction lifting request. After this input, it decides whether or not the request-origin unit intrinsic information is registered in the invalid-unit intrinsic-information registration section 11. If the request-origin unit intrinsic information is not registered in the invalid-unit intrinsic-information registration section 11, the restriction-lifting decision section 13 decides that the identification-information recording unit holding this unit intrinsic information is valid. After this, the restriction-lifting procedure is carried out. On the other hand, if the request-origin unit intrinsic information is registered in the invalid-unit intrinsic-information registration section 11, the restriction-lifting decision section 13 decides that the identification-information recording unit holding this unit intrinsic information is invalid. Hence, the restriction-lifting procedure is kept from being carried out.

In other words, as also given in the above described invalid-unit intrinsic-information registration procedure, the unit intrinsic information for identifying the identification-information recording unit which has produced a master optical disk of the false optical disk 100 which is extracted from this false optical disk 100 distributed on the market whose decision is made by the copyright holder CR such as a movie company is registered in the invalid-unit intrinsic-information registration section 11. Accordingly, the identification-information recording unit holding the unit intrinsic information registered in the invalid-unit intrinsic-information registration section 11 is probably used falsely. Hence, from this time on, the recording of the identification information should not be approved.

Therefore, if the request-origin unit intrinsic information is registered in the invalid-unit intrinsic-information registration section 11, the restriction-lifting decision section 13 discards the recording-restriction lifting request so that the identification information will not be recorded afterward. On the other hand, if it decides that the recording-restriction lifting request can be approved because the request-origin unit intrinsic information is not registered in the invalid-unit intrinsic-information registration section 11, the restriction-lifting decision section 13 outputs a restriction lifting approval to the lifting-information creation section 14.

Upon receiving this restriction lifting approval from the restriction-lifting decision section 13, the lifting-information creation section 14 creates restriction lifting information for removing the restriction so that the identification information can be recorded in the identification-information recording unit 20.

In this embodiment, as an example, the lifting-information creation section 14 creates, as the restriction lifting information, the following information:

(1) lifting information for initializing the clock 204a of the recording restriction section 204 in the identification-information recording unit 20;

(2) lifting information for initializing the counter 204b of the recording restriction section 204 in the identification-information recording unit 20;

(3) lifting information for extending the allowable period of the restriction storage section 205 of the identification-information recording unit 20; and (4) lifting information for increasing the allowable number of times of the restriction storage section 205 of the identification-information recording unit 20.

Then, it outputs them to the encryption section 15.

Upon receiving the unit intrinsic information of the request origin received together with the recording-restriction lifting request from the communication section 12, the encryption section 15 uses the request-origin unit intrinsic information as an encryption key. Then, it encrypts the restriction lifting information created by the lifting-information creation section 14 and generates encrypted restriction-lifting information. Then, it outputs it to the communication section 12. Upon receiving this encrypted restriction-lifting information, the communication section 12 establishes the privacy communication network NW between the management server 1 and the same recording unit 2 as the recording unit 2 which has received the recording-restriction lifting request. If the network NW is built up, the communication section 12 transmits the encrypted restriction-lifting information created by the encryption section 15 to the recording unit 2.

The communication section 22 of the recording unit 2 receives the encrypted restriction-lifting information from the communication section 12 of the management server 1. Then, it outputs it to the decryption section 207 of the identification-information recording unit 20. If the decryption section 207 accepts an input of the encrypted restriction-lifting information from the communication section 22, it reads the unit intrinsic information of the identification-information recording unit 20 stored in the unit intrinsic-information storage section 209. Then, it uses this unit intrinsic information as a decryption key and decrypts the encrypted restriction-lifting information. Thereby, it demodulates it into the restriction lifting information and outputs it to the restriction lifting section 208.

In accordance with the inputted restriction lifting information, the restriction lifting section 208 executes the following operation. Thereby, it removes the restriction on the generation of the identification information by the identification-information generation section 202 or the output of the identification information to the identification-information recording section 211.

For example, if the restriction lifting information is (1) the lifting information for initializing the clock 204a of the recording restriction section 204 in the identification-information recording unit 20, it initializes the clock 204a of the recording restriction section 204 in the identification-information recording unit 20, resets the time indicated by the clock 204a within the allowable period stored in the restriction storage section 205 and lifts the restriction on the recording of the identification information.

Furthermore, if the restriction lifting information is (2) the lifting information for initializing the counter 204b of the recording restriction section 204 in the identification-information recording unit 20, it initializes the counter 204b of the recording restriction section 204 in the identification-information recording unit 20, resets the count value of the generation of the identification information indicated by the counter 204b within the allowable number of times stored in the restriction storage section 205 and lifts the restriction on the recording of the identification information.

Moreover, if the restriction lifting information is (3) the lifting information for extending the allowable period of the restriction storage section 205 of the identification-information recording unit 20, it extends the allowable period stored in the restriction storage section 205 and lifts the restriction on the recording of the identification information.

In addition, if the restriction lifting information is (4) lifting information for increasing the allowable number of times of the restriction storage section 205 of the identification-information recording unit 20, it increases the allowable number of times stored in the restriction storage section 205 and lifts the restriction on the recording of the identification information.

Using any method shown in the above described example, the clock 204a or the counter 204b of the recording restriction section 204, or the allowable number of times or the allowable period of the restriction storage section 205, is initialized, reset or updated. Thereby, in the recording-restriction decision section 206, the generation of the identification information by the identification-information generation section 202 or the output of the identification information to the identification-information recording section 211 is authorized. Then, the identification information is recorded on the master optical disk 200.

As described so far, if this identification-information recording system is used, the identification-information recording unit is identified which has produced the false optical disk 100 whose decision is made by the copyright holder CR such as a movie company. Its unit intrinsic information is registered in the management server 1, and the recording unit 2 for the master optical disk 200 can record the identification-information onto the master optical disk 200 within a time or a number of times given in advance.

In addition, if the time or the number of times given in advance is exceeded, the recording unit 2 requests the management server 1 to lift the restriction. If it is an identification-information recording unit holding the unit intrinsic information registered from the false disk, the management server 1 does not respond to this request to lift the restriction. Only if a decision is made that it is an identification-information recording unit with no history of false utilization, it responds to the request to lift the restriction.

Hence, an optical-disk manufacturer which has produced and distributed an optical disk by using the identification-information recording unit 20 falsely can temporarily use the master optical disk within an allowable range. However, if this allowable range is exceeded, then after this, it will not able to manufacture the master optical disk. Such a false disk can be prevented from being more widely distributed.

Herein, in order to promote better understanding, taking a problem which can actually happen into account, a case study will be mentioned which shows how effective the identification-information recording system according to this embodiment is in the concrete.

(Case Study)

A movie company A asked an optical-disk manufacturing company B to produce optical disks so that a movie title C can be packaged onto the optical disks. The movie company A made a request to manufacture ten-thousand optical disks. However, the optical-disk manufacturing company B produced fifty-thousand such sheets and distributed forty thousand of them on the black market. This caused an unexpected decline in the market price of each optical disk of the movie title C. The movie company A examined the market and ascertained that fifty-thousand disks of the movie title C were distributed on the market. But the optical-disk manufacturing company B disappeared.

In this case, conventionally, the optical-disk manufacturing company B which holds information for manufacturing a master optical disk will be able to manufacture an unlimited number of master optical disks on which the movie title C is recorded in the future. However, if the identification-information recording system according to this embodiment is used, such false disks can be prevented from being unlawfully distributed as described below.

The movie company A brings an optical disk of the movie title C from the market into the management server 1. The management server 1 reproduces the identification information of the optical disk of the movie title C. From this identification information, it extracts the unit intrinsic information of the identification-information recording unit 20 which recorded the identification information. Then, it registers it in the invalid-unit intrinsic-information registration section 11. On the other hand, an optical-disk manufacturer manufactures a master optical disk, and in accordance with the number of times by which the identification information is generated or the number of times by which the master optical disk is manufactured, from this time on, the identification-information recording unit 20 cannot generate the identification information.

Accordingly, even if the identification-information recording unit 20 possessed by the optical-disk manufacturing company B requests the management server 1 to lift the restriction, this request to lift the restriction is rejected because the unit intrinsic information of the identification-information recording unit 20 possessed by the optical-disk manufacturing company B is registered in the invalid-unit intrinsic-information registration section 11 of the management server 1. In other words, afterward, the optical-disk manufacturing company B cannot manufacture the master optical disk, thus helping stop false such disks from being distributed.

As described above, by using the identification-information recording system according to this embodiment, even if an optical-disk manufacturing company which possesses the identification-information recording unit 20 distributes false disks onto the market through misconduct, then the damage to be suffered from those false disks can be kept down to the minimum.

Incidentally, identification information to be recorded on a master optical disk may also be an encryption key for encrypting contents to be recorded on an optical disk. At this time, in the contents-information recording section 210 of the recording unit 2, it may also be encrypted and recorded using the identification information generated by the identification-information generation section 202. Or, the identification information generated by the identification-information generation section 202 is transmitted to a film company or an authoring house. Then, the title information encrypted with the above described identification information may also be received from the film company through the tape-type recording unit 300 or the like.

In this case, the identification information or the like according to this embodiment which is recorded by displacing a concave-and-convex mark in the radial direction on a master optical disk cannot be illegally copied by a pirated-edition manufacturer or the like. Because of this advantage, if the identification information is used as an encryption key for encrypting a title, two advantages can be obtained in that an unlawful copy is prevented, and at the same time, a manufacturer as a wrongdoer is deterred from performing misconduct.

By the way, as can be seen from the mastering service manufacturer ID described in the identification information of FIG. 6, it is desirable that an identifier (i.e., the manufacturer identification information) for identifying a master optical-disk manufacturer be given into the identification information. Thereby, not only the identification-information recording unit 20 but also the master optical-disk manufacturer which uses it can be identified. Hence, if the management server 1 is provide with an invalid master-optical-disk manufacturer identifier registration section along with the invalid-unit intrinsic-information registration section 11, then in terms of an optical-disk manufacturer which holds a plurality of such identification-information recording units 2, restriction lifting requests from all those identification-information recording units 20 can be rejected. This also helps minimize the damage from a false disk.

Furthermore, it is desirable that the recording unit 2 be provide with a manufacturer identifier storage section which records an optical-disk manufacturer identifier (i.e., the manufacturer identification information) for identifying an optical-disk manufacturer, along with the unit intrinsic-information storage section 209. In this case, a part of the unit intrinsic information about the identification-information recording unit 20 described in this embodiment is formed by the optical-disk manufacturer identifier. Using this unit intrinsic information, the management server 1 decides on the lifting of restrictions, and simultaneously, it can decide on the lifting of restrictions using the optical-disk manufacturer identifier as well. Incidentally, these unit identification information and optical-disk manufacturer identifier are set by an identification-information recording-unit manufacturer which produces the identification-information recording unit 20 and is given a license for it.

Moreover, the encryption section 15 of the management server 1 and the decryption section 207 of the identification-information recording unit 20 according to this embodiment are described so that encrypting and decrypting is executed using the unit intrinsic information of the identification-information recording unit 20 as a key. This presents an advantage in that if what is configured so as to be secret and not to be rewritten inside of the unit as well as is strictly managed by the unit intrinsic-information storage section 209 is used as the key, that helps prevent pretending to be the identification-information recording unit 20. However, in order to attain this object, some different methods can also be considered. For example, the communication section 12 of the management server 1 and the communication section 22 of the recording unit 2 execute a mutual authentication on the basis of a mutually-holding certificate information, and thereafter, share an encryption key. This makes it possible to realize a form with great security which is capable of preventing any impersonation.

In addition, including a copyright-holder identifier which indicates a movie company or the like in the identification information is also effective. Specifically, a theatrical movie is filmed using a video camera or the like, and then, an optical disk can be manufactured and distributed based on the filmed contents. In this case, the restriction cannot be updated using the contents of a movie company (i.e., a piratical movie company) which offers the filmed contents. Hence, restrictions can be imposed on the recording of contents given from a movie company which offers such false contents onto a master optical disk.

Furthermore, in this embodiment, the identification information is generated by the identification-information generation section 202 inside of the identification-information recording unit 20. However, the present invention is not limited to this. For example, the identification information may also be generated by the management server 1, or the identification information may also be generated by a third-party organization. In this case, it is desirable that the management server 1 side or the third-party organization issue a copyright-holder identifier of a movie company or the like, or a master optical-disk manufacturer identifier.

Moreover, the allowable number of times of the restriction storage section 205 of the identification-information recording unit 20 may also be several times or once. If it is designated as once, every time a master optical disk is manufactured, the management server 1 needs to be asked to lift the restriction. The management server 1 can manage every master optical disk to be manufactured, thus reducing the distribution of false disks to the limit.

In addition, in this embodiment, recording restrictions on the creation of a master optical disk are described so as to be shackled by a mastering number of times, the number of times by which the master optical disk is manufactured, the number of times by which the identification information is generated, a mastering period of time, the period of time when the master optical disk is manufactured and the period of time when the identification information is generated. However, it is not limited to this. The essence is to use the identification-information recording unit 20 in which a false disk has been produced, from this time on, only within a specific authorization range. Therefore, every restriction for attaining this object is within the scope of the present invention.

Figure 8:
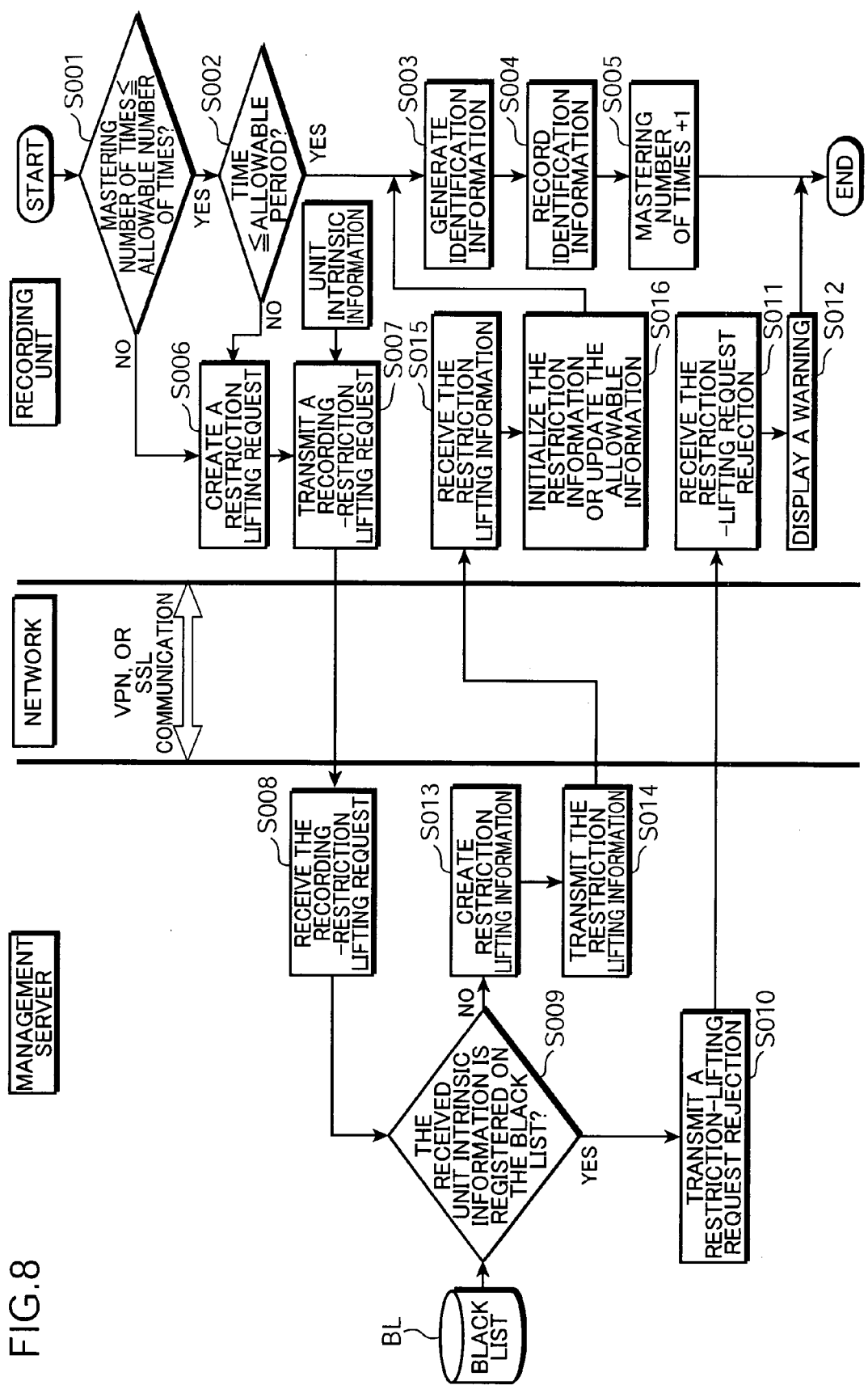
FIG. 8 is a flow chart, showing the operation of the identification-information recording system shown in FIG. 2.

Next, an operation will be described of the identification-information recording system according to this embodiment. FIG. 8 is a flow chart, showing the operation of the management server 1 and the recording unit 2 in the identification-information recording system according to this embodiment.

First, before the recording unit 2 records the identification information, the recording-restriction decision section 206 decides whether the mastering number of times is within the allowable number of times (in a step S001) and whether the current time is within the allowable period of time when the mastering is authorized (in a step S002).

If the mastering number of times and the mastering period are both within the allowable range, the identification-information generation section 202 generates the identification information to be recorded onto the master optical disk 200 (in a step S003). The identification information is generated, including the unit intrinsic information of the identification-information recording unit 20 stored in the unit intrinsic-information storage section 209, the random-number sequence generated by the random-number generation section 201, the current time indicated by the clock 204a and the counter information indicated by the counter 204b inside of the recording restriction section 204.

The generated identification information is outputted to the identification-information recording section 211 and is recorded onto the master optical disk 200 (in a step S004). After the identification-information recording section 211 records the identification information onto the master optical disk 200, the recording restriction section 204 gives the internal counter 204b "+1" and executes an increment in the mastering number of times (in a step S005).

On the other hand, at the step S001 or S002, if the decision is made that the mastering number of times is beyond the allowable range or the current time is out of the allowable range where the mastering is executed, the recording-restriction decision section 206 generates a restriction lifting request to be transmitted to the management server 1 (in a step S006).

The communication section 22 of the recording unit 2 adds, to this restriction lifting request, the unit intrinsic information of the identification-information recording unit 20 recorded in the unit intrinsic-information storage section 209. Then, it transmits the recording-restriction lifting request to the communication section 12 of the management server 1 (in a step S007).

The transmitted recording-restriction lifting request is received by the communication section 12 of the management server 1 (in a step S008). Incidentally, using VPN or SSL communication, the management server 1 and the recording unit 2 establish a network connection as a secure communication channel where the alteration or wiretapping of data can be prevented.

Next, the restriction-lifting decision section 13 of the management server 1 decides whether the received unit intrinsic information is registered on a black list BL (in a step S009). By the way, the black list BL indicates information which is registered in the invalid-unit intrinsic-information registration section 11 inside of the management server 1.

At the step S009, if the decision is made that the received unit intrinsic information is registered on the black list BL, the communication section 12 of the management server 1 transmits a notification for rejecting the received restriction lifting request to the recording unit 2 (in a step S010). The communication section 22 of the recording unit 2 receives this restriction-lifting request rejection transmitted by the management server 1 (in a step S011).

If the communication section 22 of the recording unit 2 receives this restriction-lifting request rejection, the identification-information generation section 202 is prohibited from generating the identification information, or the generated identification information is prohibited from being outputted to the identification-information recording section 211. Thereby, a restriction is placed on the recording of the identification information onto the master optical disk 200. Besides, the fact that the identification-information recording unit 20 is registered on the black list BL of the management server 1 is displayed in a display unit (not shown) or the like, so that a warning display is given (in a step S012).

In contrast, at the step S009, if the decision is made that the received unit intrinsic information is not registered on the black list BL, the lifting-information creation section 14 creates restriction lifting information for removing the identification-information recording restriction in the recording unit 2 (in a step S013).

The restriction lifting information created by the lifting-information creation section 14 is transmitted to the recording unit 2 by the communication section 12 of the management server 1 (in a step S014). The transmitted restriction lifting information is received by the communication section 22 of the recording unit 2 (in a step S015).

Upon receiving the restriction lifting information, the restriction lifting section 208 of the identification-information recording unit 20 initializes the time information or the number-of-times information of the clock 204a, the counter 204b or the like of the recording restriction section 204, or updates the allowable period of time when and the allowable number of times by which the restriction storage section 205 can record the identification information. Thereby, it removes the recording restriction on the recording of the identification information (in a step S016).

After the restriction lifting section 208 has removed the restriction on the recording of the identification information, the identification-information generation section 202 generates the identification information (in the step S003). The generated identification information is outputted to the identification-information recording section 211 and is recorded onto the master optical disk 200 (in the step S004). After the identification-information recording section 211 records the identification information onto the master optical disk 200, the recording restriction section 204 gives the internal counter 204b "+1" and executes an increment in the mastering number of times (in the step S005).

As described above, if the identification-information recording system according to this embodiment is used, the recording unit 2 can record the identification information only within a restriction range given in advance. If such a recording exceeds the restriction range where the identification information can be recorded, the recording unit 2 transmits the restriction lifting request to the management server 1.

The management server 1 decides on the identification-information recording unit 20 which has issued the lifting request, on the basis of the unit intrinsic information incidental to this lifting request. The management server 1 decides whether the received unit intrinsic information is registered on the black list BL of the management server 1. Only if it is not registered, it creates the restriction lifting information and transmits it to the recording unit 2. The recording unit 2 receives the restriction lifting information from the management server 1 and removes the restriction on the recording of the identification information. Thereby, it can record the identification information onto the master optical disk 200.

Incidentally, the black list BL registered in the management server 1 is a list of the unit intrinsic information of the identification-information recording unit 20 which has recorded a false disk brought in by a copyright holder such as a movie company or the like and which is recorded on this false disk. Accordingly, if an optical disk is judged to be a false disk, the unit intrinsic information which has recorded this false disk is registered on the black list BL in the management server 1. Therefore, even if the restriction lifting request comes from the identification-information recording unit 20 holding this unit intrinsic information afterward, this request can be eliminated. Hence, the recording operation of the identification information by the identification-information recording unit 20 which has manufactured the false disk becomes invalid. This make it possible to restrain the distribution of false disks to the minimum.

Third Embodiment

Figure 9:
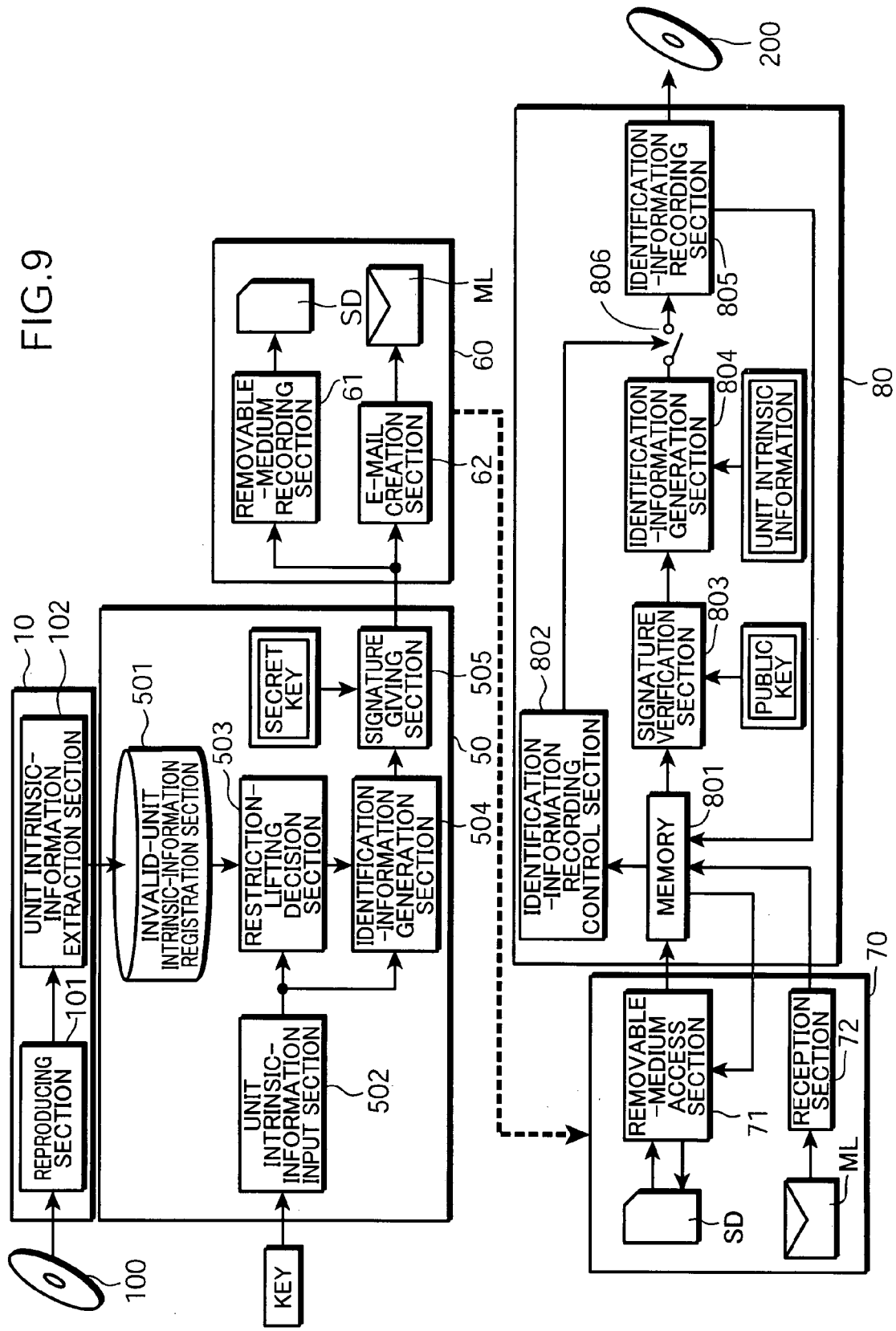
FIG. 9 is a block diagram, showing the configuration of an identification-information recording system according to a third embodiment of the present invention.

Next, an identification-information recording system according to a third embodiment of the present invention will be described in detail with reference to some drawings. FIG. 9 is a block diagram, showing a characteristic function of the identification-information recording system according to this embodiment.

The identification-information recording system shown in FIG. 9 is configured by: an identification-information reproducing unit 10; a management unit 50; an identification-information notification unit 60; an identification-information reception unit 70; and an identification-information recording unit 80.

The identification-information reproducing unit 10 is formed by a reproducing section 101 and a unit intrinsic-information extraction section 102. It is a unit which: reproduces identification information of the false optical disk 100 which is brought in by a copyright holder such as a movie company; specifies the unit intrinsic information of the identification-information recording unit 80 which has recorded the identification information of the false optical disk 100; and outputs it to an invalid-unit intrinsic-information registration section 501. Its configuration is equivalent to that of the identification-information reproducing unit 10 in FIG. 2 shown in the second embodiment. Herein, its detailed description is omitted.

The management unit 50 is a unit which accepts an input of the unit intrinsic information of the identification-information recording unit 80 given a restriction on the recording of the identification information, and decides whether the restriction on the identification-information recording unit 80 holding this unit intrinsic information can be lifted. It is formed by: the invalid-unit intrinsic-information registration section 501; a unit intrinsic-information input section 502; a restriction-lifting decision section 503; an identification-information generation section 504; and a signature giving section 505.

The invalid-unit intrinsic-information registration section 501 is a database for registering the unit intrinsic information which: is extracted by reproducing the identification information of a false disk; and is used for identifying the identification-information recording unit 80 which has recorded the identification information of the false disk.

The unit intrinsic-information input section 502 is a section which inputs the unit intrinsic information of the identification-information recording unit 80 given the restriction on the recording of the identification information. In this embodiment, it is designed to input the unit intrinsic information by means of a key input. Incidentally, how to input the unit intrinsic information is not limited to this. For example, the unit intrinsic information sent with electronic mail, post, telephone or the like may also be inputted. Or, using the identification-information recording unit 80 and a network connection, a notification may also be given of the unit intrinsic information of the identification-information recording unit 80 given the restriction on the recording of the identification information. Besides, in the case where a portable medium such as a semiconductor memory and an optical disk is used, the unit intrinsic-information input section 502 is supposed to be a reproducing unit which corresponds to such a portable medium. The unit intrinsic information inputted by any of these methods is outputted to the restriction-lifting decision section 503.

The restriction-lifting decision section 503 decides whether the unit intrinsic information inputted in the unit intrinsic-information input section 502 is already registered in the invalid-unit intrinsic-information registration section 501. If it is already registered in the invalid-unit intrinsic-information registration section 501, that means the false disk has been manufactured by the identification-information recording unit 80 holding this unit intrinsic information. Hence, the following processing is cancelled, and the restriction on the recording of the identification information by the identification-information recording unit 80 is supposed to be lifted. On the other hand, if it is not registered in the invalid-unit intrinsic-information registration section 501, it outputs an authorization to generate the identification information to the identification-information generation section 504.

After receiving an input of this identification-information generation authorization from the restriction-lifting decision section 503, the identification-information generation section 504 creates the identification information based on the unit intrinsic information inputted in the unit intrinsic-information input section 502. This identification information is created, in the same way as the second embodiment, by giving a random-number sequence to the inputted unit intrinsic information, giving a count value every time the identification information is generated in the unit intrinsic information, or inputting date and time information from a clock (not shown) and giving it to the unit intrinsic information. In addition, the identification information generated by the identification-information generation section 504 is not limited to a single piece. An identification-information list may also be generated by collecting a plurality of pieces of identification information. The generated identification information is outputted to the signature giving section 505.

On the basis of a secret key held secretly inside of the management unit 50, the signature giving section 505 gives a digital signature to the identification information generated by the identification-information generation section 504. The identification information given this digital signature is outputted to the identification-information notification unit 60.

The identification-information notification unit 60 is a unit which notifies the identification-information reception unit 70 of the identification information inputted from the management unit 50. It is configured so that a removable-medium recording section 61 records the inputted identification information onto a portable medium SD such as a semiconductor memory and an optical disk. Or, it is configured so that an e-mail creation section 62 creates an electronic mail ML including the inputted identification information and notifies the identification-information reception unit 70.

Incidentally, in this embodiment, the description is given is such a manner that the portable medium SD or the electronic mail ML notifies the identification-information reception unit 70 of the identification information generated by the management unit 50. However, the present invention is not limited to this. The identification-information notification unit 60's real nature is to notify the identification-information reception unit 70 of the identification information generated by the management unit 50. Instead of a removable medium or an electronic mail, such a notification may also be given by post, fax or telephone.

The identification-information reception unit 70 is a unit which outputs, to the identification-information recording unit 80, the identification information sent with the portable medium SD or the electronic mail ML from the identification-information notification unit 60. A removable-medium access section 71 may also reproduce the identification information sent with the portable medium SD and outputs the reproduced identification information to the identification-information recording unit 80. Or, a reception section 72 may also receive the identification information sent with the electronic mail ML and output the received identification information to the identification-information recording unit 80.

By the way, the identification-information reception unit 70's essential function is to output the identification information sent from the identification-information notification unit 60 to the identification-information recording unit 80. Hence, the identification-information notification unit 60 and the identification-information reception unit 70 may also directly receive the identification information via a network and output the received identification information to the identification-information recording unit 80. For example, in the case where a notification of the identification information is given by mail, fax, telephone or the like from the identification-information notification unit 60, the identification-information reception unit 70 may also input the identification information through a key operation and output the inputted identification information to the identification-information recording unit 80.

The identification-information recording unit 80 is a unit which records, onto the master optical disk 200, the identification information sent from the identification-information notification unit 60 and which is received by the identification-information reception unit 70. It is formed by: a memory 801; an identification-information recording control section 802; a signature verification section 803; an identification-information generation section 804; an identification-information recording section 805; and a switch 806.

The memory 801 is a memory which stores the identification information received by the identification-information reception unit 70. In the case where the memory 801 is a portable medium such as a semiconductor memory and an optical disk on which a record and a reproduction can be executed, after the memory has stored the identification information recorded in a removable medium, desirably, the storage contents of the removable medium should be erased. Besides, if the identification information identical with the identification information used once is inputted in the memory 801, desirably, the storage in the memory 801 should be rejected. Hence, the identification information used once needs to be turned into such a form as can be never used.

If deciding that the identification information is not recorded in the memory 801, in order to hinder the identification information generated by the identification-information generation section 804 from being outputted to the identification-information recording section 805, the identification-information recording control section 802 outputs an identification-information recording prohibition to the switch 806. Thereby, the switch 806 severs the connection of the identification-information generation section 804 and the identification-information recording section 805. Consequently, the identification information generated by the identification-information generation section 804 is prohibited from being recorded onto the master optical disk 200.

The signature verification section 803 reads one piece of identification information from the memory 801. Then, it verifies a signature, using information on a public key which holds accompanying digital signature information on its inside. This public key corresponds to the secret key held inside of the management unit 50. The signature verification section 803 decides whether the digital signature verification which accompanies the identification information read from the memory 801 by the signature verification section 803 is a normal signature or not. If deciding that it is not a normal signature, it suspends the following processing, or again, reads the identification information from the memory 801 and verifies a signature. Only if the signature verification section 803 decides that it is a normal signature, it outputs the identification information whose digital signature part has been deleted to the identification-information generation section 804.

The identification-information generation section 804 gives the unit intrinsic information intrinsic to the identification-information recording unit 80 held inside of the identification-information recording unit 80 to the identification information which has passed the signature verification. Then, it outputs it to the identification-information recording section 805.

The identification-information recording section 805 is a unit which records, onto the master optical disk 200, the identification information which the identification-information generation section 804 has generated by giving its own unit intrinsic information. Its configuration is equivalent to the mastering unit 21 including the identification-information recording section 211 of FIG. 2 shown in the second embodiment. Herein, its detailed description is omitted. After recording the identification information onto the master optical disk 200, the identification-information recording section 805 erases the identification information whose recording is completed from the memory 801.

As described above, the identification-information recording system according to this embodiment records, onto a master optical disk, the identification information stored in the memory 801 by the identification-information recording unit 80, one by one, and erases the identification information whose recording is completed from the memory 801. Therefore, as a matter of course, restrictions are imposed on the number of master optical disks recordable by the identification-information recording unit 80.

In addition, if the identification-information recording control section 802 decides that there is no identification information which can be recorded in the memory 801, it needs to notify the management unit 50 of its own unit intrinsic information and acquire the identification information. In terms of how to notify the management unit 50 of the unit intrinsic information, any can be adopted of the following methods:

(1) connecting the identification-information recording control section 802 of the identification-information recording unit 80 and the unit intrinsic-information input section 502 of the management unit 50 so that they can communicate together, and from the identification-information recording unit 80 through the establishment of a network, notifying the management unit 50 of the unit intrinsic information;

(2) giving a notification via a removable medium such as a semiconductor memory and an optical disk (in this case, the unit intrinsic-information input section 502 is a functional block which includes an access section to the removable medium);

(3) notifying an operator on the side of the management unit 50 of the unit intrinsic information of the identification-information recording unit 80 by mail, fax, telephone or the like, and inputting the unit intrinsic information through the key operation of the management unit 50; and the like.

The management unit 50 decides that the inputted unit intrinsic information is not registered on the black list in the invalid-unit intrinsic-information registration section 501 and generates the identification information. Using a removable medium, an electronic mail or the like, it notifies the identification-information recording unit 80 of it. Upon receiving this notification of the identification information by the management unit 50, the identification-information recording unit 80 stores it in the memory 801. Then, it resumes recording the identification information onto the master optical disk 200.

According to the above described configuration, in the case where a false disk is distributed on the market, the identification information of the false disk is reproduced. Thereby, based on the unit intrinsic information recorded in this identification information, the identification-information recording unit 80 which has manufactured the false disk is identified. This unit intrinsic information can be registered on the black list in the invalid-unit intrinsic-information registration section 501.

Once it is registered on the black list, no notification of the recordable identification information is given to the identification-information recording unit 80 which holds the registered unit intrinsic. As a result, the identification-information recording unit 80 which has manufactured the illegal disk cannot record the identification information any more. This helps restrain the distribution spread of such a false disk to the minimum.

Fourth Embodiment

Figure 10:
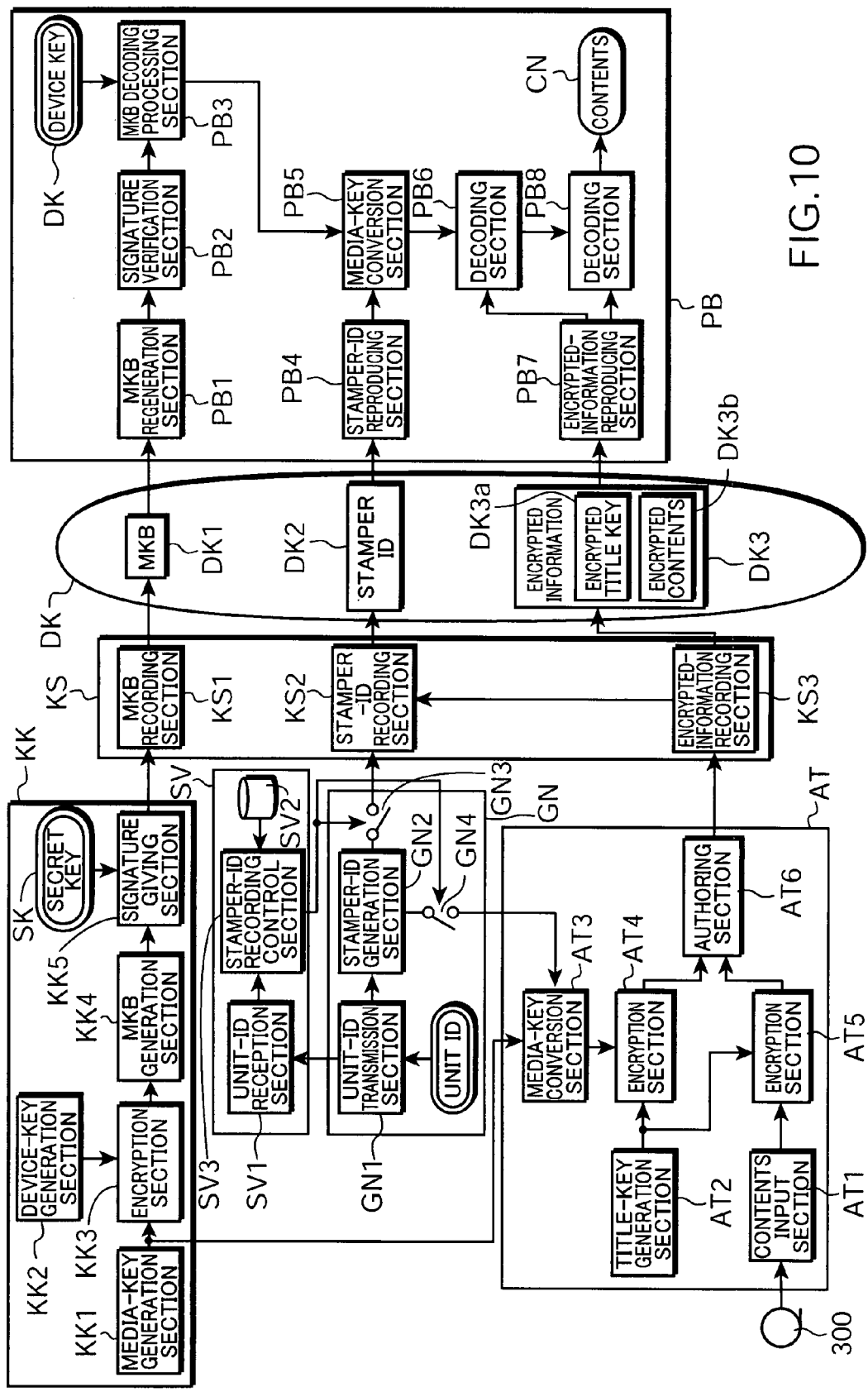
FIG. 10 is a block diagram, showing the configuration of an identification-information recording system according to a fourth embodiment of the present invention.

Next, an identification-information recording system according to a fourth embodiment of the present invention will be described in detail with reference to some drawings. FIG. 10 is a block diagram, showing an encrypting and recording system which records encrypted contents on an optical disk using the identification-information recording system according to the fourth embodiment of the present invention. The encrypting and recording system according to this embodiment is configured by: a key management mechanism KK; an ID recording control server SV; an ID generation unit GN; an authoring unit AT; a recording unit KS; and a reproducing unit PB for an optical disk DK.

The key management mechanism KK is a mechanism which generates a media key used for encrypting contents and generates a device key held by the reproducing unit PB. It includes: a media-key generation section KK1; a device-key generation section KK2; an encryption section KK3; an MKB generation section KK4; and a signature giving section KK5.

First, the media-key generation section KK1 of the key management mechanism KK generates a media key. The device-key generation section KK2 generates a device key. The encryption section KK3 encrypts the generated media key with the generated device key. The media key is generated using a random number, or is generated by allowing a secret key held inside to execute a data conversion using a one-way function or by such another. The generated media key is sent to the authoring unit AT and is used for encrypting contents. The device key is generated using a random number, or is generated by allowing a secret key held inside to execute a data conversion using a one-way function or by such another. The device key is given identification information and is generated so as to be intrinsic to every key management mechanism KK or intrinsic to every manufacturer which produces the key management mechanism KK.

The encrypted media key encrypted by all the device keys is converted and generated into a data format MKB (or media key block) by the MKB generation section KK4. The MKB is a data block which can generate a normal media key through a series of processing by all the device keys issued from the key management mechanism KK. Incidentally, if an abnormal reproducing unit PB and software whose inside is hacked or the like are distributed, a device key which can cope with those conditions re-creates an MKB so that the normal media key will not be outputted. From this time onward, it records this newly-created MKB on an optical disk to be distributed. Thereby, it works toward annulling any reproduction by the above described unlawful reproducing drive or hacking software.

The signature giving section KK5 gives the created MKB a digital signature using a secret key SK held on its inside. Thereby, a person who is not aware of such a secret key can be prevented from falsifying the MKB. The digital signature is generated, for example, using a public-key algorithm such as an elliptic curve cryptography algorithm. The MKB given the signature is outputted to the recording unit KS.

The ID generation unit GN is a unit which generates a stamper ID that is identification information to be recorded on an optical disk. First, before a unit-ID transmission section GN1 of the ID generation unit GN generates the stamper ID, it transmits a unit ID (i.e., the unit intrinsic information) held inside of the ID generation unit GN to a unit-ID reception section SV1 of the ID recording control server SV. The unit-ID reception section SV1 receives the unit ID from the ID generation unit GN.

In addition, the ID recording control server SV reproduces the stamper ID which corresponds to the identification information of a distributed false disk. On the basis of the reproduced stamper ID, it identifies the ID generation unit GN which has generated this stamper ID. It has an invalid-unit intrinsic-information registration section SV2 internally which extracts the unit ID corresponding to this ID generation unit GN from the stamper ID and registers it. Hence, the unit ID registered in the invalid-unit intrinsic-information registration section SV2 is on a black list of the unit ID of the ID generation unit GN used unlawfully.

A stamper-ID recording control section SV3 of the ID recording control server SV receives the unit ID via the unit-ID reception section SV1 from the ID generation unit GN. Then, it compares it with the black list registered in the invalid-unit intrinsic-information registration section SV2. Thereby, it decides whether the received unit ID is registered on the black list. If it is registered, it outputs an identification-information recording stop command to a switch GN3 and a switch GN4 of the ID generation unit GN, while if it is not registered, it outputs an identification-information recording authorization command to those switches. Besides, based on the unit ID held by the ID generation unit GN, a stamper-ID generation section GN2 of the ID generation unit GN generates a stamper ID (i.e., the identification information).

If receiving the identification-information recording stop command from the ID recording control server SV, the switch GN3 of the ID generation unit GN deletes the generated stamper ID. Then, it suspends the following processing. On the other hand, if receiving the identification-information recording authorization command from the ID recording control server SV, it outputs the generated stamper ID to the recording unit KS. In addition, if receiving the identification-information recording stop command from the ID recording control server SV, the switch GN4 of the ID generation unit GN deletes the generated stamper ID. Then, it suspends the following processing. In contrast, if receiving the identification-information recording authorization command from the ID recording control server SV, it outputs the generated stamper ID to the authoring unit AT.

The authoring unit AT is a unit which acquires contents from a copyright holder such as a movie company, and encrypts and authors it. First, a contents input section AT1 of the authoring unit AT accepts an input of contents information 300 acquired from a movie company or the like.

Next, a title-key generation section AT2 of the authoring unit AT generates a title key for encrypting the inputted contents. This title key is generated with a random number, or by selecting an intrinsic value to every contents.

In addition, using a one-way function (i.e., a one-way data conversion mode in an encryption algorithm), a media-key conversion section AT3 of the authoring unit AT executes a data conversion of the media key inputted from the key management mechanism KK with the stamper ID inputted from the ID generation unit GN. Thereby, it generates a stamper key.

The generated title key is encrypted with the stamper key by an encryption section AT4, and the inputted contents is encrypted with the generated title key by an encryption section AT5. The encrypted title key and the encrypted contents are authored to be a DVD type, a Blu-ray disk type or an HD-DVD type according to the type of an optical disk on which a record is made by an authoring section AT6. The encrypted information subjected to this authoring is outputted to the recording unit KS.

The recording unit KS is a unit which records, onto a master optical disk, the MKB from the key management mechanism KK, the stamper ID from the ID generation unit GN and the encrypted information from the authoring unit AT. The recording unit KS has the same configuration as the mastering unit 21 of FIG. 2 in the second embodiment. An MKB recording section KS1 and an encrypted-information recording section KS3 records, with a concave-and-convex mark onto a master optical disk, the MKB and the encrypted information as the contents information (i.e., the main information). A stamper-ID recording section KS2 receives a synchronizing timing signal from the encrypted-information recording section KS3. Then, it sets the stamper ID (DK2) as the identification information (i.e., the sub-information) and displaces the above described concave-and-convex mark in the radial direction. Thereby, it records it onto the master optical disk. In this way, the concave-and-convex mark of the manufactured master optical disk is transferred onto an optical-disk base such as polycarbonate. Thereby, the optical disk DK is manufactured. The optical disk DK includes the MKB (DK1) and encrypted information DK3 recorded with the concave-and-convex mark as the contents information (i.e., the main information), and the stamper ID (DK2) recorded by displacing the above described concave-and-convex mark in the radial direction as the identification information (i.e., the sub-information).

Therefore, if a false disk is generated by generating the stamper ID illegally using the ID generation unit GN, this false disk is collected from the market and it is brought into the ID recording control server SV. Thereby, the unit ID which identifies the ID generation unit GN used falsely is registered in the invalid-unit intrinsic-information registration section SV2 of the ID recording control server SV. After this, the generation of the stamper ID is prohibited. Thus, the damage to be suffered from such false disks can be kept down to the minimum.

The reproducing unit PB is a unit which reproduces and decrypts the encrypted contents from the optical disk DK, and thereby, reproduces the encrypted contents. At the starting time when the optical disk DK is loaded, an MKB reproducing section PB1 of the reproducing unit PB reproduces the MKB (DK1) given a signature from the optical disk DK. The MKB (DK1) is recorded as the concave-and-convex mark in a control data area or a user area inside of the optical disk DK.

A signature verification section PB2 of the reproducing unit PB verifies a digital signature which accompanies the MKB, using a public key held inside of the reproduction unit PB. As the result of this verification, If it is not a normal signature, in other words, if the MKB is falsified midway, or if it decides that the MKB is issued from other than the key management mechanism KK, the signature verification section PB2 halts the following reproduction operation. In contrast, as the verification result of the digital signature, if it decides that the MKB is not falsified or in another such case, the signature verification section PB2 deletes the digital signature part. Then, an MKB decoding processing section PB3 extracts the media key through an MKB decoding processing of the MKB and an internally-held device key DK. By the way, a device key made invalid by the key management mechanism KK cannot extract the media key. Consequently, it cannot reproduce the contents.

Furthermore, a stamper-ID reproducing section PB4 of the reproducing unit PB reproduces the stamper ID (DK2) from the radial displacement of the concave-and-convex mark of the optical disk DK. Next, a media-key conversion section PB5 execute a data conversion, using the reproduced stamper ID, of the media key extracted in the MKB decoding processing using a one-way function or the like. Thereby, it generates a stamper key. This data conversion is the same function as the media-key conversion section AT3 in the authoring unit AT.

Moreover, an encrypted-information reproducing section PB7 of the reproducing unit PB reproduces an encrypted title key DK3a and encrypted contents DK3b as the encrypted information DK3 from the user area of the optical disk DK. In a decoding section PB6, the reproduced encrypted title key is decoded with the stamper key. In a decoding section PB8, the reproduced encrypted contents are decoded with the decoded title key. Thereby, contents CN are reproduced.

As described above, if the identification-information recording system according to this embodiment is used, the contents are encrypted with the stamper ID generated by the ID generation unit GN which is not made invalid by the ID recording control server SV. At the same time, the stamper ID is recorded in the optical disk DK. Therefore, the ID generation unit GN made invalid by the ID recording control server SV because it has manufactured a false disk or the like cannot output the stamper ID which is the key for encrypting the contents. This makes it impossible to record the stamper ID on the optical disk DK. Consequently, it cannot manufacture any normal optical disk.

In each embodiment described above, the identification information is recorded on a master optical disk by displacing the concave-and-convex mark which is a record mark in the radial direction. How to record the identification information on a master optical disk will be described in detail. The position in the radial direction of the area where identification information is recorded on a master optical disk is shifted by a displacement length equivalent to an infinitesimal quantity on the inner-circumference side (or the outer-circumference side) from the position of a pit formed when no identification information is recorded. Herein, the infinitesimal quantity is a quantity which is drowned out by a noise observed at the reproduction time. In practice, the pit is not formed in a position shifted conspicuously.

Therefore, the identification-information recording system according to each embodiment described above records identification information by allowing a record mark formed on a master optical disk to undergo a radial displacement. The reproducing unit of an optical disk manufactured from the master optical disk reads the radial displacement of the record mark using a tracking-error signal and reproduces the identification information. By the way, as described so far, the identification information is recorded so as to include unit intrinsic information for identifying the identification-information recording unit 20 or the like which has recorded the identification information.

Incidentally, the method of recording identification information used in the present invention is not limited only to the above described radial displacement of a record mark. For example, each position of two edges in the track direction of a record mark formed by superimposing identification information may also be shifted to the phase-leading (or phase-lagging) position by a displacement length equivalent to a specific infinitesimal time from the edge position of a pit formed when identification information is not superimposed.

In other words, as described earlier, without recording identification information using the displacement of a record mark in the radial direction, it is recorded using a tangential modulation in which the record mark's edge position is displaced to a leading position or a lagging position. In the case where, identification information is recorded using such a tangential modulation, in accordance with the identification information, the rise position or the fall position of laser-beam irradiation for forming a record mark is led or lagged on a time base. Thereby, it can be realized by displacing the edge position of the record mark formed on the optical-disk surface in the tangential direction. Besides, at the time of reproduction, a decision is made whether with respect to a clock signal generated by a PLL (or phase locked loop) circuit which executes a generation synchronously with a record mark, the rise position or the fall position of a reproduced signal is led or lagged. Thereby, the identification information can be reproduced.

Furthermore, how to record identification information used in the present invention is not limited to those methods. The identification information may also be recorded, not only using the above described radial displacement or tangential displacement, but also by changing the depth or the width in the radius direction. In this case, the recording unit can record identification information by changing the intensity of a laser beam or the width of laser-beam irradiation when the recording is made using a multi-pulse. Or, at the time of reproduction, identification information can be reproduced from a change in the modulation degree of a reproduced waveform.

In addition, the recording of identification information is not limited especially to the above described laser. Another ray of light such as an electron beam may also be used.

Moreover, identification information can also be recorded by forcibly inserting an error bit into a specific area. Or, identification information may also be recorded by replacing an ordinary modulation when a record mark is recorded by the one different from it. Further, identification information may also be recorded using an encryption method different from contents information in a control area. The point is that a manufacturer which does not hold a license to record or reproduce identification information cannot record the identification information easily. Hence, as long as this point is obtained, any method can be adopted.

On the basis of each embodiment described above, the present invention is summarized as described below. In sum, an identification-information recording system according to the present invention, comprising: a recording unit which records, onto a master optical disk, identification information including unit intrinsic information given intrinsically to every recording unit; and a management unit which manages the recording of the identification information onto the master optical disk, wherein: the management unit includes a reproducing section which reproduces first identification information from an optical disk manufactured using a first master optical disk, and a registration section which extracts and registers at least a part of the first identification information reproduced by the reproducing section; the recording unit includes a hold section which holds the unit intrinsic information about this recording unit, and a notification section which notifies the management unit of the unit intrinsic information held in the hold section before second identification information is recorded onto a second master optical disk; the management unit further includes a decision section which decides whether the second identification information can be recorded onto the second master optical disk in the recording unit, based on the registration information of the registration section and the unit intrinsic information on the recording unit sent from the notification section of the recording unit; and the recording unit further includes an identification-information generation section which generates the second identification information including the unit intrinsic information held in the hold section, an identification-information recording section which records the second identification information onto the second master optical disk, and a recording control section which, based on the result of a decision made by the decision section of the management unit, controls the recording of the second identification information onto the second master optical disk.

A management unit according to the present invention which manages the recording of identification information including unit intrinsic information given intrinsically to every recording unit onto a master optical disk, comprising: a reproducing section which reproduces first identification information from an optical disk manufactured using a first master optical disk; a registration section which extracts and registers at least a part of the first identification information reproduced by the reproduction section; and a decision section which decides whether a second identification information can be recorded onto a second master optical disk in the recording unit, based on the registration information of the registration section and the unit intrinsic information on the recording unit sent from the recording unit, wherein if the decision section of the management unit decides that the recording unit can record the second identification information onto the second master optical disk, the decision section notifies the recording unit of recording control information for authorizing the recording unit to record the second identification information onto the second master optical disk.

A recording unit according to the present invention which records, onto a master optical disk, identification information including unit intrinsic information given intrinsically to every recording unit, comprising: a hold section which holds the unit intrinsic information about the recording unit; a notification section which notifies a management unit of the unit intrinsic information held in the hold section before the identification information is recorded onto the master optical disk; an identification-information generation section which generates the identification information including the unit intrinsic information held in the hold section; an identification-information recording section which records the identification information onto the master optical disk; and a recording control section which controls the recording of the identification information onto the master optical disk, based on recording control information sent from the management unit.

A recording control circuit according to the present invention which is mounted on a recording unit that records identification information onto a master optical disk, comprising: a hold circuit which holds unit intrinsic information given intrinsically to the recording control circuit; a recording-signal generation circuit which generates a recording signal for recording the identification information including the unit intrinsic information held in the hold circuit onto the master optical disk; a recording restriction circuit which restricts at least either of the period of time when and the number of times where the identification information can be recorded onto the master optical disk; and a restriction lifting circuit which gives notice of the unit intrinsic information held in the hold circuit, and based on recording control information sent from a management unit, lifts the recording restriction on the identification information by the recording restriction circuit.

According to the above described configurations, in the management unit, first identification information is reproduced from an optical disk manufactured using a first master optical disk, and at least a part of the reproduced first identification information is extracted and registered. Besides, in the recording unit, a notification of the unit intrinsic information of this recording unit is given to the management unit before second identification information is recorded onto a second master optical disk. At this time, in the management unit, based on the registration information and the unit intrinsic information, a decision is made whether the second identification information can be recorded onto the second master optical disk by the recording unit. In the recording unit, based on the result of a decision, the recording of the second identification information onto the second master optical disk is controlled. As a result, identification information can be recorded on an optical disk so that a copy is difficult to make, as well as even if a master optical disk is falsely manufactured using a recording unit which records the identification information, the recording of the identification information by the misused recording unit can be annulled afterward, and thereby, the spread of such a false disk can be restrained to the minimum.

It is preferable that: the registration section of the management unit extract and register the unit intrinsic information included in the first identification information reproduced by the reproducing section; and unless the unit intrinsic information sent from the notification section of the recording unit is registered in the registration section, the decision section of the management unit generate recording control information for authorizing the recording unit to record the second identification information onto the second master optical disk.

In this case, in the management unit, the unit intrinsic information included in the first identification information is extract and registered, and unless the unit intrinsic information sent from the recording unit is registered, recording control information is generated for authorizing the recording unit to record the second identification information onto the second master optical disk. Therefore, permission can be given of only the recording of identification information by the recording unit which is rightfully used.

It is preferable that: manufacturer identification information for identifying a manufacturer which manufactures the first master optical disk be added to the unit intrinsic information included in the first identification information; manufacturer identification information for identifying a manufacturer which manufactures the second master optical disk be added to the unit intrinsic information on the recording unit which records the second identification information onto the second master optical disk; the registration section of the management unit extract and register the manufacturer identification information from the unit intrinsic information included in the first identification information reproduced by the reproducing section; and unless the manufacturer identification information added to the unit intrinsic information sent from the notification section of the recording unit is registered in the registration section, the decision section of the management unit generate recording control information for authorizing the recording unit to record the second identification information onto the second master optical disk.

In this case, in the management unit, the manufacturer identification information is extracted and registered from the unit intrinsic information included in the first identification information, and unless the manufacturer identification information added to the unit intrinsic information sent from the recording unit is registered, recording control information is generated for authorizing the recording unit to record the second identification information onto the second master optical disk. Therefore, only if all the recording units possessed by a manufacturer is rightfully used, permission can be given of the recording of identification information by the recording unit.

It is preferable that: if the decision section of the management unit decides that the recording unit can record the second identification information onto the second master optical disk, the decision section notify the recording control section of the recording unit of recording control information for authorizing the recording unit to record the second identification information onto the second master optical disk; and on the basis of this recording control information, the recording control section of the recording unit control the recording of the second identification information onto the second master optical disk.

In this case, in the management unit, if the decision is made that the recording unit can record the second identification information onto the second master optical disk, the recording unit is notified of recording control information for authorizing the recording unit to record the second identification information onto the second master optical disk, and in the recording unit, on the basis of this recording control information, the recording of the second identification information onto the second master optical disk is controlled. Therefore, permission can be given of only the recording of identification information by the recording unit which is rightfully used.

It is preferable that: the recording control section of the recording unit have a timer, and based on the time clocked by the timer, restrict the period of time when the second identification information can be recorded onto the second master optical disk; if the recording of the second identification information is restricted by the recording control section of the recording unit, the notification section of the recording unit notify the decision section of the management unit of the unit intrinsic information held in the hold section of the recording unit; and the decision section of the management unit receive the unit intrinsic information from the notification section of the recording unit, and if the decision section of the management unit decides that the recording unit can record the second identification information onto the second master optical disk, the decision section notify the recording control section of the recording unit of recording control information for lifting the restriction by the recording control section of the recording unit; and on the basis of this recording control information, the recording control section of the recording unit lift the recording restriction on the second identification information.

In this case, in the recording unit, if the recording of the second identification information is restricted because of the period of time when the second identification information can be recorded, the management unit is notified of the unit intrinsic information of the recording unit, and in the management unit, if the decision is made that the recording unit can record the second identification information onto the second master optical disk, the recording unit is notified of recording control information for lifting the restriction, and in the recording unit, on the basis of this recording control information, the recording restriction on the second identification information is lifted. Therefore, the period of time when the recording unit which is rightfully used can record identification information can be extended.

It is preferable that: the recording control section of the recording unit have a counter which counts the number of recordings of the identification information, and based on the number of the recordings counted by the counter, restrict the number of times up to which the second identification information can be recorded onto the second master optical disk; if the recording of the second identification information is restricted by the recording control section of the recording unit, the notification section of the recording unit notify the decision section of the management unit of the unit intrinsic information held in the hold section of the recording unit; the decision section of the management unit receive the unit intrinsic information from the notification section of the recording unit, and if the decision section of the management unit decides that the recording unit can record the second identification information onto the second master optical disk, the decision section notify the recording control section of the recording unit of recording control information for lifting the restriction by the recording control section of the recording unit; and on the basis of this recording control information, the recording control section of the recording unit lift the recording restriction on the second identification information.

In this case, in the recording unit, if the recording of the second identification information is restricted because of the number of times up to which the identification information can be recorded, the management unit is notified of the unit intrinsic information of the recording unit, in the management unit, if the decision is made that the recording unit can record the second identification information onto the second master optical disk, the recording unit is notified of recording control information for lifting the restriction, and in the recording unit, on the basis of this recording control information, the recording restriction on the second identification information is lifted. Therefore, the number of times up to which the recording unit that is rightfully used can record identification information can be increased.

It is preferable that the identification information include master optical-disk intrinsic information intrinsic to the master optical disk on which this identification information is recorded.

In this case, a master optical disk can be identified using master optical-disk intrinsic information included in the identification information. Therefore, a recording unit and a manufacturer which has manufactured a false master optical disk can be easily identified, and from this time on, the recording of the identification information by the recording unit which is unlawfully used can be made invalid.

It is preferable that the identification-information generation section of the recording unit generate the second identification information, using the unit intrinsic information on the recording unit and a pseudo-random number sequence.

In this case, the identification information becomes difficult to decrypt. Therefore, an unjust manufacturer can be prevented from forging the identification information.

It is preferable that the identification-information generation section of the recording unit generate the second identification information, using the unit intrinsic information on the recording unit and time information on the time when the identification information is recorded onto the master optical disk.

In this case, using time information on the time when the identification information is recorded which is included in the identification information, a restriction is placed on the period of time when the identification information can be recorded.

It is preferable that the identification-information generation section of the recording unit generate the second identification information, using the unit intrinsic information on the recording unit and number-of-times information on the number of times by which the identification information is recorded onto the master optical disk.

In this case, using number-of-times information on the number of times by which the identification information is recorded which is included in the identification information, a restriction is placed on the number of times up to which the identification information can be recorded.

It is preferable that the hold section of the recording unit include a memory in which no rewrite can be done, the memory holding the unit intrinsic information on the recording unit.

In this case, the unit intrinsic information on the recording unit is held in a memory in which no rewrite can be done. Therefore, a third party can be prevented from rewriting the unit intrinsic information maliciously so that an illegal recording unit can impersonate another recording unit. Another wrongdoing can also be prevented, such as making it impossible to identify the recording unit with the unit intrinsic information.

It is preferable that the hold section of the recording unit be formed by an integrated circuit, the integrated circuit holding the unit intrinsic information on the recording unit.

In this case, the unit intrinsic information on the recording unit is held in an integrated circuit. Therefore, a third party can be prevented from rewriting the unit intrinsic information maliciously so that an illegal recording unit can impersonate another recording unit. Another wrongdoing can also be prevented, such as making it impossible to identify the recording unit with the unit intrinsic information.

It is preferable that: main information on the optical disk be recorded using a record mark which has a concave-convex shape; the reproducing section of the management unit reproduce the first identification information by irradiating the optical disk with a laser beam and detecting a tracking-error signal which indicates a radial displacement of the record mark; and when the identification-information recording section of the recording unit records the main information by irradiating the second master optical disk with an electron beam or a laser beam and forming the record mark onto the second master optical disk, the identification-information recording section record the second identification information onto the second master optical disk by displacing the irradiation position of the electron beam or laser beam in the radial direction of the second master optical disk.

In this case, the identification information is recorded onto the master optical disk by displacing the irradiation position of the electron beam or laser beam in the radial direction of the master optical disk. Therefore, the identification information can be recorded so as not to be easily copied on an optical disk. Besides, the identification information is reproduced by detecting a tracking-error signal which indicates a radial displacement of the record mark. Therefore, the identification information recorded so as to be difficult to copy can be precisely and easily reproduced.

It is preferable that: main information on the optical disk be recorded using a record mark which has a concave-convex shape; the reproducing section of the management unit reproduce the first identification information by irradiating the optical disk with a laser beam and extracting a phase error in the edge position of the record mark; and when the identification-information recording section of the recording unit records the main information by irradiating the second master optical disk with an electron beam or a laser beam and forming the record mark onto the second master optical disk, the identification-information recording section record the second identification information onto the second master optical disk by changing the irradiation timing of the electron beam or laser beam in the tangential direction of the second master optical disk.

In this case, the identification information is recorded onto the master optical disk by changing the irradiation timing of the electron beam or laser beam in the tangential direction of the master optical disk. Therefore, the identification information can be recorded so as not to be easily copied on an optical disk. Besides, the identification information is reproduced by extracting a phase error in the edge position of the record mark. Therefore, the identification information recorded so as to be difficult to copy can be precisely and easily reproduced.

By utilizing the present invention, an identification-information recording system, a management unit, a recording unit and a recording control circuit can be provided which are capable of recording identification information on an optical disk so that a copy is difficult to make, as well as even if a master optical disk is falsely manufactured using a recording unit which records the identification information, afterward annulling the recording of the identification information by the misused recording unit, and thereby, restraining the spread of such a false disk to the minimum.

This application is based on Japanese patent application serial No. 2006-160543, filed in Japan Patent Office on Jun. 9, 2006, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An identification-information recording system, comprising:
   a recording unit which records, onto a master optical disk, identification information including unit intrinsic information given intrinsically to every recording unit; and
   a management unit which manages the recording of the identification information onto the master optical disk, wherein:
   the management unit includes a reproducing section which reproduces first identification information from an optical disk manufactured using a first master optical disk, and a registration section which extracts and registers at least a part of the first identification information reproduced by the reproducing section;
   the recording unit includes a hold section which holds the unit intrinsic information about this recording unit, and a notification section which notifies the management unit of the unit intrinsic information held in the hold section before second identification information is recorded onto a second master optical disk;
   the management unit further includes a decision section which decides whether the second identification information can be recorded onto the second master optical disk in the recording unit, based on the registration information of the registration section and the unit intrinsic information on the recording unit sent from the notification section of the recording unit; and
   the recording unit further includes an identification-information generation section which generates the second identification information including the unit intrinsic information held in the hold section, an identification-information recording section which records the second identification information onto the second master optical disk, and a recording control section which, based on the result of a decision made by the decision section of the management unit, controls the recording of the second identification information onto the second master optical disk.

2. The identification-information recording system according to claim 1, wherein:
   the registration section of the management unit extracts and registers the unit intrinsic information included in the first identification information reproduced by the reproducing section; and
   unless the unit intrinsic information sent from the notification section of the recording unit is registered in the registration section, the decision section of the management unit generates recording control information for authorizing the recording unit to record the second identification information onto the second master optical disk.

3. The identification-information recording system according to claim 1, wherein:
   manufacturer identification information for identifying a manufacturer which manufactures the first master optical disk is added to the unit intrinsic information included in the first identification information;
   manufacturer identification information for identifying a manufacturer which manufactures the second master optical disk is added to the unit intrinsic information on the recording unit which records the second identification information onto the second master optical disk;
   the registration section of the management unit extracts and registers the manufacturer identification information from the unit intrinsic information included in the first identification information reproduced by the reproducing section; and
   unless the manufacturer identification information added to the unit intrinsic information sent from the notification section of the recording unit is registered in the registration section, the decision section of the management unit generates recording control information for authorizing the recording unit to record the second identification information onto the second master optical disk.

4. The identification-information recording system according to claim 1, wherein:
   if the decision section of the management unit decides that the recording unit can record the second identification information onto the second master optical disk, the decision section notifies the recording control section of the recording unit of recording control information for authorizing the recording unit to record the second identification information onto the second master optical disk; and
   on the basis of this recording control information, the recording control section of the recording unit controls the recording of the second identification information onto the second master optical disk.

5. The identification-information recording system according to claim 1, wherein:
   the recording control section of the recording unit has a timer, and based on the time clocked by the timer, restricts the period of time when the second identification information can be recorded onto the second master optical disk;
   if the recording of the second identification information is restricted by the recording control section of the recording unit, the notification section of the recording unit notifies the decision section of the management unit of the unit intrinsic information held in the hold section of the recording unit;
   the decision section of the management unit receives the unit intrinsic information from the notification section of the recording unit, and if the decision section of the management unit decides that the recording unit can record the second identification information onto the second master optical disk, the decision section notifies the recording control section of the recording unit of recording control information for lifting the restriction by the recording control section of the recording unit; and
   on the basis of this recording control information, the recording control section of the recording unit lifts the recording restriction on the second identification information.

6. The identification-information recording system according to claim 1, wherein:
   the recording control section of the recording unit has a counter which counts the number of recordings of the identification information, and based on the number of the recordings counted by the counter, restricts the number of times up to which the second identification information can be recorded onto the second master optical disk;
   if the recording of the second identification information is restricted by the recording control section of the recording unit, the notification section of the recording unit notifies the decision section of the management unit of the unit intrinsic information held in the hold section of the recording unit;

the decision section of the management unit receives the unit intrinsic information from the notification section of the recording unit, and if the decision section of the management unit decides that the recording unit can record the second identification information onto the second master optical disk, the decision section notifies the recording control section of the recording unit of recording control information for lifting the restriction by the recording control section of the recording unit; and on the basis of this recording control information, the recording control section of the recording unit lifts the recording restriction on the second identification information.

7. The identification-information recording system according to claim 1, wherein the identification information includes master optical-disk intrinsic information intrinsic to the master optical disk on which this identification information is recorded.

8. The identification-information recording system according to claim 1, wherein the identification-information generation section of the recording unit generates the second identification information, using the unit intrinsic information on the recording unit and a pseudo-random number sequence.

9. The identification-information recording system according to claim 1, wherein the identification-information generation section of the recording unit generates the second identification information, using the unit intrinsic information on the recording unit and time information on the time when the identification information is recorded onto the master optical disk.

10. The identification-information recording system according to claim 1, wherein the identification-information generation section of the recording unit generates the second identification information, using the unit intrinsic information on the recording unit and number-of-times information on the number of times by which the identification information is recorded onto the master optical disk.

11. The identification-information recording system according to claim 1, wherein the hold section of the recording unit includes a memory in which no rewrite can be done, the memory holding the unit intrinsic information on the recording unit.

12. The identification-information recording system according to claim 1, wherein the hold section of the recording unit is formed by an integrated circuit, the integrated circuit holding the unit intrinsic information on the recording unit.

13. The identification-information recording system according to claim 1, wherein:
main information on the optical disk is recorded using a record mark which has a concave-convex shape;
the reproducing section of the management unit reproduces the first identification information by irradiating the optical disk with a laser beam and detecting a tracking-error signal which indicates a radial displacement of the record mark; and
when the identification-information recording section of the recording unit records the main information by irradiating the second master optical disk with an electron beam or a laser beam and forming the record mark onto the second master optical disk, the identification-information recording section records the second identification information onto the second master optical disk by displacing the irradiation position of the electron beam or laser beam in the radial direction of the second master optical disk.

14. The identification-information recording system according to claim 1, wherein:
main information on the optical disk is recorded using a record mark which has a concave-convex shape;
the reproducing section of the management unit reproduces the first identification information by irradiating the optical disk with a laser beam and extracting a phase error in the edge position of the record mark; and
when the identification-information recording section of the recording unit records the main information by irradiating the second master optical disk with an electron beam or a laser beam and forming the record mark onto the second master optical disk, the identification-information recording section records the second identification information onto the second master optical disk by changing the irradiation timing of the electron beam or laser beam in the tangential direction of the second master optical disk.

15. A management unit which manages the recording of identification information including unit intrinsic information given intrinsically to every recording unit onto a master optical disk, comprising:
a reproducing section which reproduces first identification information from an optical disk manufactured using a first master optical disk;
a registration section which extracts and registers at least a part of the first identification information reproduced by the reproducing section; and
a decision section which decides whether a second identification information can be recorded onto a second master optical disk in the recording unit, based on the registration information of the registration section and the unit intrinsic information on the recording unit sent from the recording unit,
wherein if the decision section of the management unit decides that the recording unit can record the second identification information onto the second master optical disk, the decision section notifies the recording unit of recording control information for authorizing the recording unit to record the second identification information onto the second master optical disk.

* * * * *